United States Patent
Teraoka et al.

(10) Patent No.: US 9,841,323 B2
(45) Date of Patent: Dec. 12, 2017

(54) SPECTROSCOPIC UNIT AND SPECTROSCOPIC DEVICE USING SAME

(71) Applicant: KONICA MINOLTA, INC., Chiyoda-ku (JP)

(72) Inventors: Yoshitaka Teraoka, Suita (JP); Katsutoshi Tsurutani, Hirano-ku (JP); Wataru Yamaguchi, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/104,206

(22) PCT Filed: Sep. 17, 2014

(86) PCT No.: PCT/JP2014/074488
§ 371 (c)(1),
(2) Date: Jun. 13, 2016

(87) PCT Pub. No.: WO2015/087594
PCT Pub. Date: Jun. 18, 2015

(65) Prior Publication Data
US 2016/0313183 A1     Oct. 27, 2016

(30) Foreign Application Priority Data
Dec. 13, 2013 (JP) .................................. 2013-257798

(51) Int. Cl.
*G01N 21/25* (2006.01)
*G01J 3/26* (2006.01)
(Continued)

(52) U.S. Cl.
CPC .............. *G01J 3/26* (2013.01); *G01J 3/0221* (2013.01); *G01J 3/0262* (2013.01); *G01J 3/12* (2013.01);
(Continued)

(58) Field of Classification Search
CPC .... G02B 26/00; G02B 5/28; G01J 3/26; G01J 3/28; G01J 3/30; G01J 3/38; G01J 3/02
See application file for complete search history.

(56) References Cited

U.S. PATENT DOCUMENTS 5,218,473 A     6/1993  Seddon et al.
5,400,115 A  *  3/1995  Muench ................... G02B 5/28
                                                                355/38
(Continued)

FOREIGN PATENT DOCUMENTS

CN       1311429(A)        9/2001
CN       1311429           12/2001
(Continued)

OTHER PUBLICATIONS

Office Action dated Jun. 30, 2016 which issued in the corresponding Japanese Patent Application No. 2015-516131 with English translation.

(Continued)

*Primary Examiner* — Abdullahi Nur
(74) *Attorney, Agent, or Firm* — Cozen O'Connor

(57) ABSTRACT

A spectroscopic unit and spectroscopic device according to the present invention are provided with a filter that is provided with a plurality of optical filter elements disposed in order from the entrance side to the exit side of light under measurement and has different transmission wavelengths corresponding to entrance positions along a first direction. A first optical filter element from among the plurality of optical filter elements is tilted with respect to a second optical filter element disposed adjacently to the first optical filter element as a result of the first optical filter element being rotated by a prescribed angle with a third direction that is perpendicular to both the first direction and s second direction from the entrance side to the exit side as the axis of rotation thereof (Continued)

or being rotated by a prescribed angle with the first direction as the axis of rotation thereof.

7 Claims, 18 Drawing Sheets

(51) Int. Cl.
    *G01J 3/12*     (2006.01)
    *G01J 3/36*     (2006.01)
    *G02B 5/28*     (2006.01)
    *G01J 3/30*     (2006.01)
    *G02B 26/00*     (2006.01)
    *G01J 3/28*     (2006.01)
    *G01J 3/02*     (2006.01)

(52) U.S. Cl.
    CPC ............... *G01J 3/2803* (2013.01); *G01J 3/30* (2013.01); *G01J 3/36* (2013.01); *G02B 5/28* (2013.01); *G02B 26/001* (2013.01); *G01J 2003/1234* (2013.01); *G01J 2003/1243* (2013.01)

(56) References Cited

U.S. PATENT DOCUMENTS

| | | |
|---|---|---|
| 6,950,285 B2 | 9/2005 | Wada et al. |
| 2004/0165694 A1 | 8/2004 | Yonetani et al. |
| 2007/0081145 A1 | 4/2007 | Yonetani et al. |
| 2009/0231579 A1 | 9/2009 | Thevenon et al. |
| 2011/0199381 A1 | 8/2011 | Tamai |
| 2014/0312212 A1* | 10/2014 | Schappacher ............ G01J 3/26 250/225 |

FOREIGN PATENT DOCUMENTS

| | | |
|---|---|---|
| CN | 202203854 | 4/2012 |
| JP | 02-132405 | 5/1990 |
| JP | 08-247846 | 9/1996 |
| JP | H 08-247846 | 9/1996 |
| JP | 2001-218106 | 8/2001 |
| JP | 2004-165723 | 6/2004 |
| JP | 2008-249697 | 10/2008 |
| JP | 2011-253078 | 12/2011 |
| JP | 2013-207373 | 10/2013 |
| WO | WO 2008/063440 | 5/2008 |

OTHER PUBLICATIONS

Office Action dated Dec. 27, 2016 which issued in the corresponding Chinese Patent Application No. 201480068015.X.

Office Action dated Jul. 3, 2017 which issued in the corresponding Chinese Patent Application No. 201480068015.X.

Supplementary Search Report dated Jul. 12, 2017 which issued in the corresponding European Patent Application No. 14869728.7.

* cited by examiner

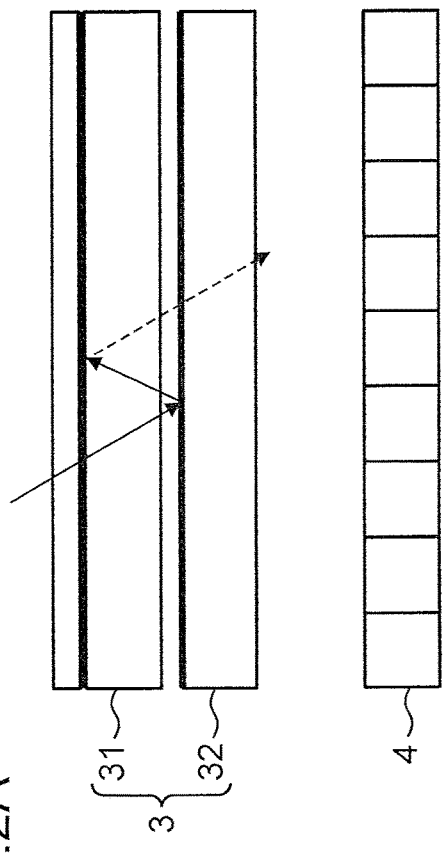
FIG.2A
FIG.2B
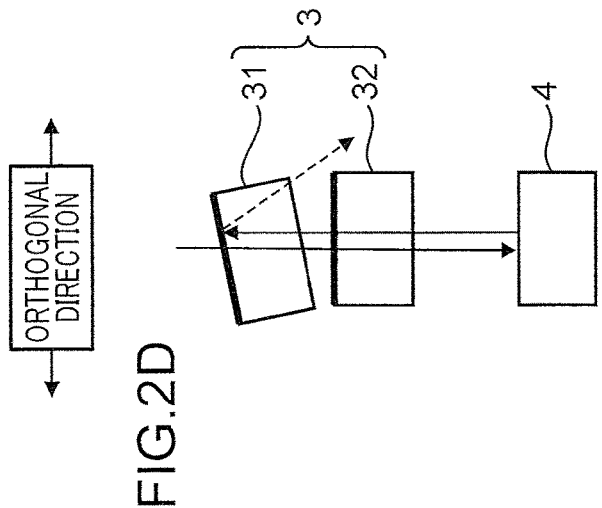
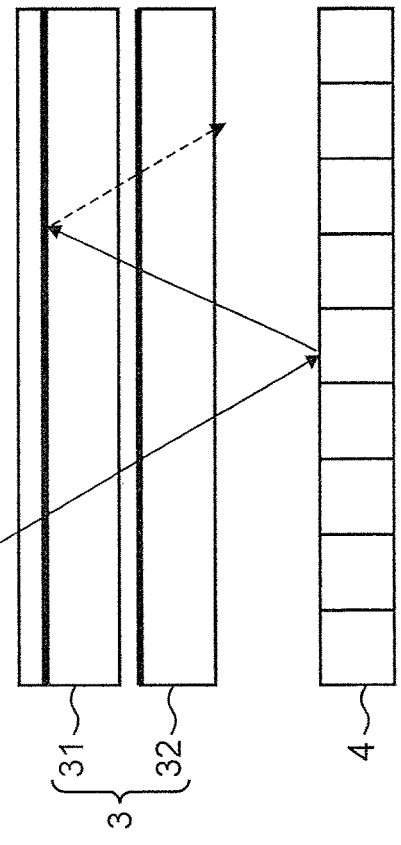
FIG.2C
FIG.2D

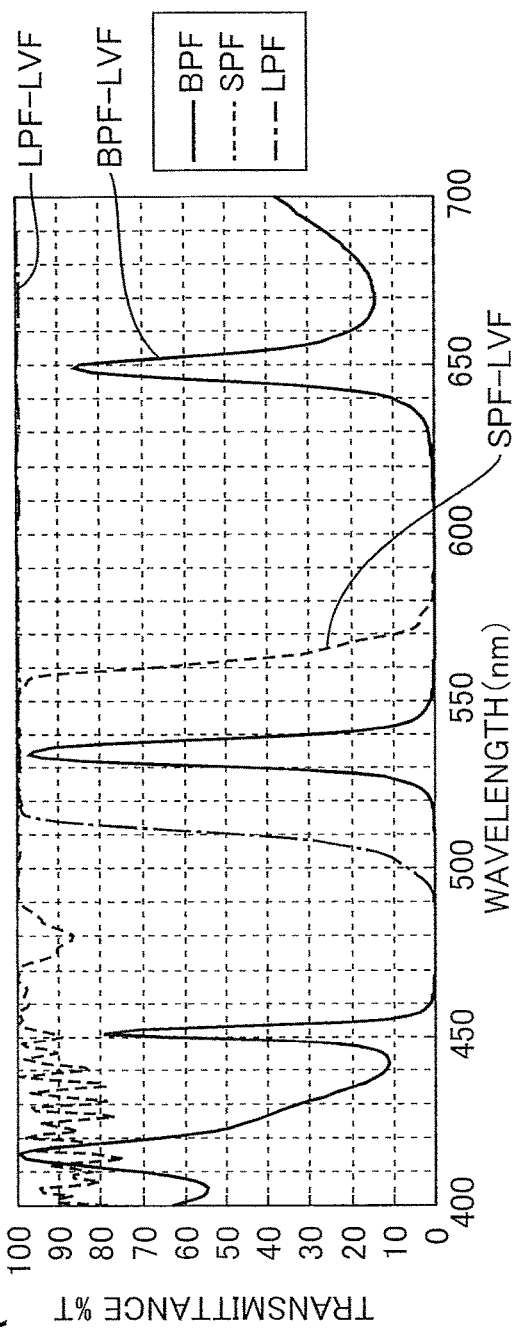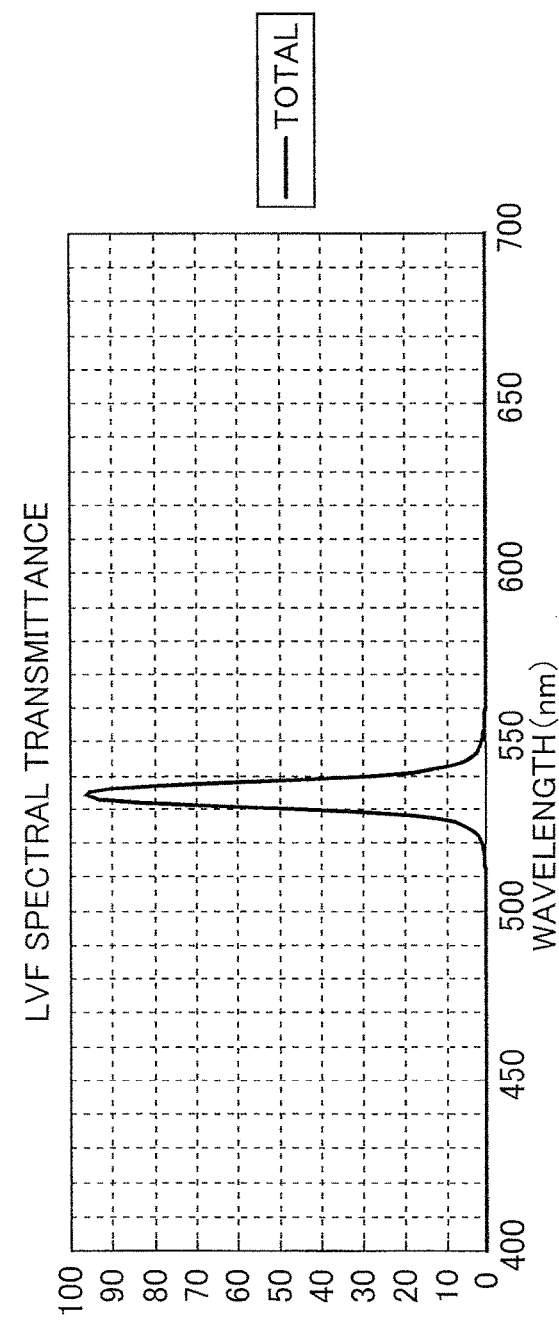

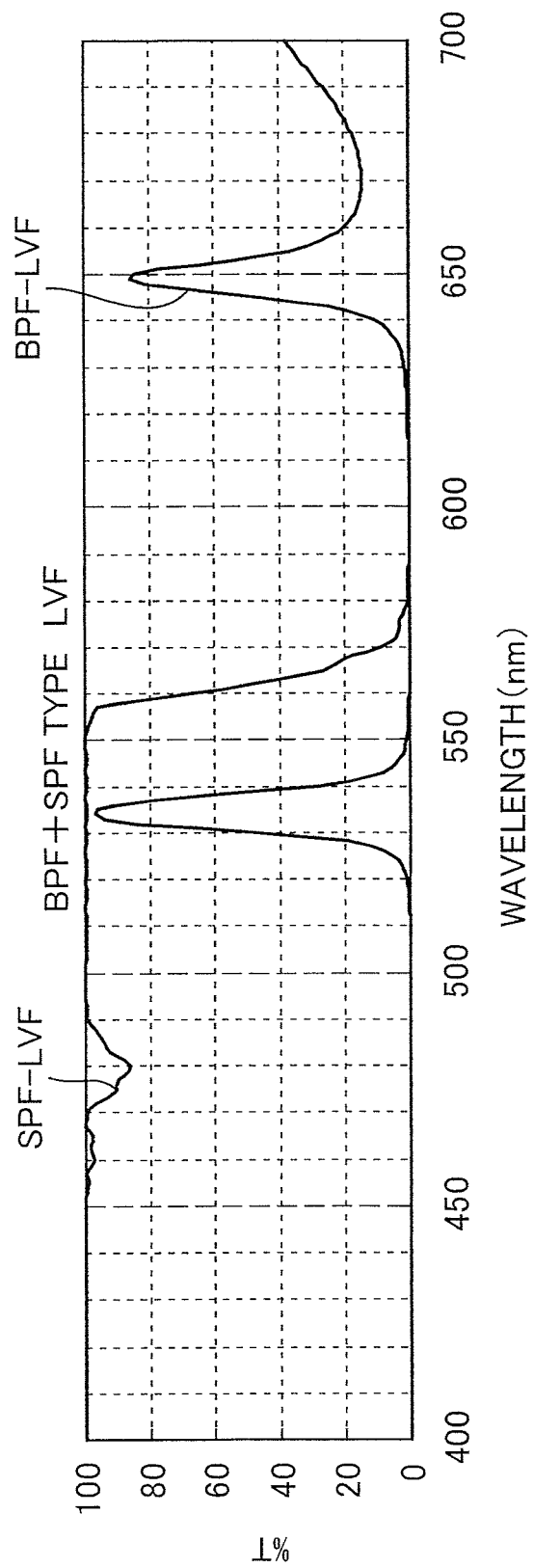

SPECTROSCOPIC UNIT AND SPECTROSCOPIC DEVICE USING SAME

RELATED APPLICATIONS

This is a U.S. National Phase Application under 35 USC 371 of International Application PCT/JP2014/074488 filed on Sep. 17, 2014.

This application claims the priority of Japanese application no. 2013-257798 filed Dec. 13, 2013, the entire content of which is hereby incorporated by reference.

TECHNICAL FIELD

The present invention relates to a spectroscopic unit for spectrally dispersing target light to be measured, on a wavelength-by-wavelength (wavenumber-by-wavenumber) basis and outputting signals corresponding to respective intensities of received wavelength-separated light components, and a spectroscopic device using this spectroscopic unit, and more particularly to a spectroscopic unit and a spectroscopic device each using a filter whose transmission wavelength varies depending on an incident position along a given one direction.

BACKGROUND ART

A spectroscopic device is designed to measure a spectrum of target light to be measured, and generally includes: a spectroscopic section for spectrally dispersing target light on a wavelength-by-wavelength (wavenumber-by-wavelength) basis; a light-receiving section for receiving light components spectrally dispersed by the spectroscopic section, i.e., wavelength-separated light components, and outputting signals corresponding to respective intensities of the received wavelength-separated light components; and a calculation section for calculating respective intensities of the wavelength-separated light components (a distribution of intensity with respect to wavelength; a spectrum), based on the signals output from the light-receiving section. As one example of this type of spectroscopic device, there is a spectroscopic device in which a filter whose transmission wavelength varies depending on an incident position along a given one direction is used in the spectroscopic section in order to spectrally disperse target light.

In this spectroscopic device, the light-receiving section, which includes a plurality of light-receiving elements to which respective different wavelength bands are assigned, is disposed in spaced-apart relation to the filter by a given distance. In this case, the light-receiving section reflects a part of incident light because it is incapable of fully photoelectrically converting the incident light, and thereby multiple-reflection occurs between the filter and the light-receiving section. As a result, generally, each of the light-receiving elements in the light-receiving section receives not only a light component in a specific wavelength band assigned to the light-receiving element, i.e., a light component to be essentially received by the light-receiving element, but also a light component in a different wavelength band to be essentially received by one of the remaining light-receiving elements. As measures against this problem, in a conventional device, the filter and the light-receiving section are disposed such that one of them is inclined with respect to the remaining one of them.

For example, the following Patent Literature 1 discloses a spectrograph having an inclined detector window, which comprises: a light source capable of emitting a light beam; an entrance slit capable of transmitting a part of the light beam emitted by the light source to generate a transmitted light beam; a grating capable of diffracting the light beam transmitted through the entrance slit to generate a diffracted light beam to thereby produce a spectrum in an image plane (X', Y'); a detector for detecting the light beam diffracted by the grating, wherein the detector comprises a window for allowing the light beam diffracted by the grating to be transmitted therethrough, wherein a part of the diffracted light beam generates reflection on the window or between the window and a sensing surface of the detector included in a detection plane (X", Y"); and at least one inclining means for enabling avoiding interference spectra. The spectrograph is characterized in that the at least one inclining means for enabling avoiding interference spectra comprises the detector window which is inclined. That is, the detector window is disposed in front of and inclined with respect to the sensing surface of the detector to thereby eliminate multiple-reflection which would otherwise occur between the detection window and the sensing surface of the detector.

Meanwhile, for example, for design or production reasons, the filter whose transmission wavelength varies depending on an incident position along a given one direction cannot be realized using a single optical filter element, so that it is generally constructed by combining a plurality of optical filter elements together. This leads to occurrence of multiple-reflection within the filter. That is, multiple-reflection occurs between the plurality of optical filter elements. Thus, in such a spectroscopic device using the filter, even when the filter and the light-receiving section are disposed such that one of them is inclined with respect to the remaining one of them, due to the multiple-reflection within the filter, each of the light-receiving elements in the light-receiving section receives not only a light component in a specific wavelength band to be essentially received by the light-receiving element, but also a light component in a wavelength band to be essentially received by one of the remaining light-receiving elements.

CITATION LIST

Patent Literature

Patent Document 1: JP 2008-249697A

SUMMARY OF INVENTION

The present invention is directed to providing a spectroscopic unit capable of reducing multiple-reflection which would otherwise occur within the aforementioned filter, to thereby allow each of a plurality of light-receiving elements of a light-receiving section to be reduced in terms of receiving of a light component in a wavelength band other than a specific wavelength band to be essentially received by each light-receiving element, and providing a spectroscopic device using the spectroscopic unit.

According to one aspect of the present invention, there is provided a spectroscopic unit and a spectroscopic device which includes a filter having a transmission wavelength which varies depending on an incident position along a first direction. The filter includes a plurality of optical filter elements sequentially arranged in a direction from an incident side to an output side of the target light, wherein a first optical filter element as one of the plurality of optical filter elements is rotated, by a given angle, about a rotational axis defined along a third direction orthogonal to each of the first direction and a second direction extending from the incident side toward the output side of the target light, or rotated, by a given angle, about a rotational axis defined along the first direction, and thereby disposed inclinedly with respect to a second optical filter element disposed in adjacent relation to the first optical filter element. Therefore, the spectroscopic unit and the spectroscopic device of the present invention make it possible to reduce multiple-reflection which would otherwise occur within the filter, to thereby reduce receiving of a light component in wavelength band other than a specific wavelength band to be essentially received by each light-receiving element.

The above and other objects, features and advantages of the present invention will be apparent from the following detailed description and the accompanying drawings.

BRIEF DESCRIPTION OF DRAWINGS

FIG. 2 is a fragmentary enlarged diagram depicting the configuration of the spectroscopic device according to the first embodiment.

FIG. 4 is an explanatory diagram of a transmission wavelength characteristic of each type of filter constituting the linear variable filter in the spectroscopic device according to the first embodiment.

FIG. 7 is a diagram depicting a transmission wavelength characteristic of an LVF at an incident position corresponding to a transmission wavelength band having a center wavelength of 535 nm.

DESCRIPTION OF EMBODIMENTS

Based on the drawings, an embodiment of the present invention will now be described. It should be noted that elements or components assigned with the same reference sign in the figures means that they are identical, and therefore duplicated description thereof will be omitted appropriately. In this specification, for a generic term, a reference sign without any suffix is assigned thereto, and, for a term meaning an individual element or component, a reference sign with a suffix is assigned thereto.

First Embodiment

Figure 1A:
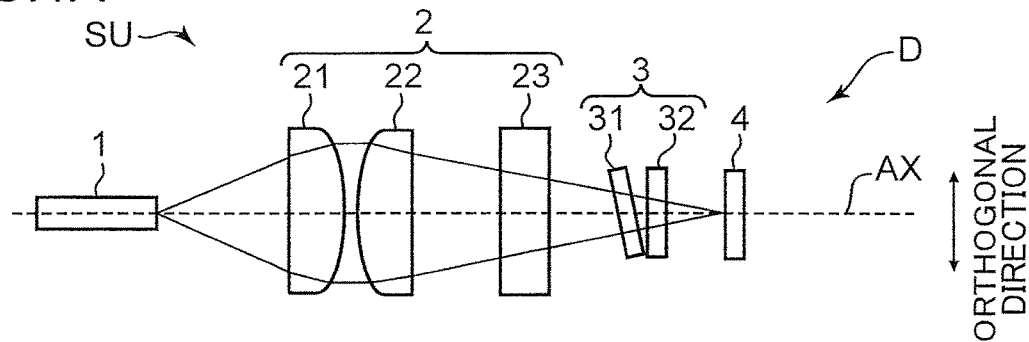
FIG. 1 is a diagram depicting a configuration of a spectroscopic device according to a first embodiment.
Figure 1B:
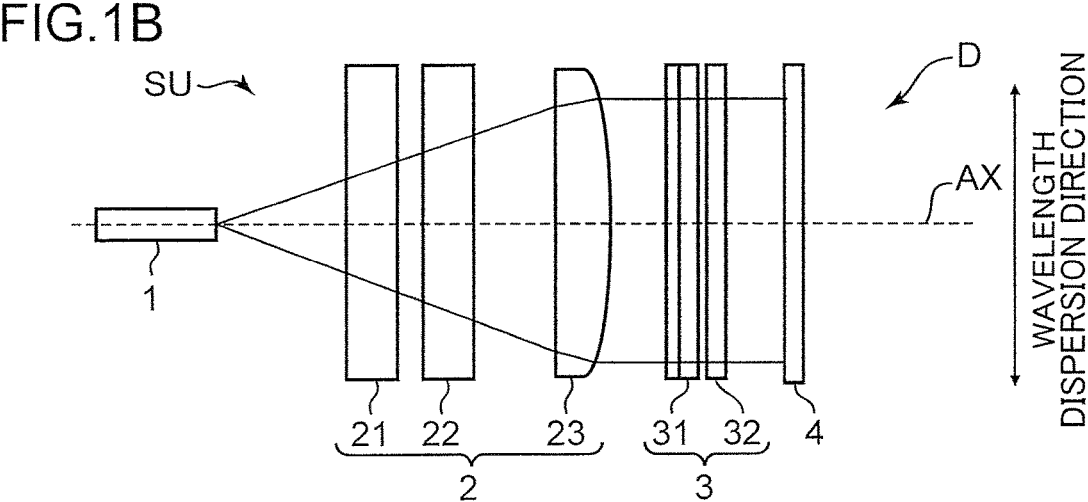
Figure 1C:
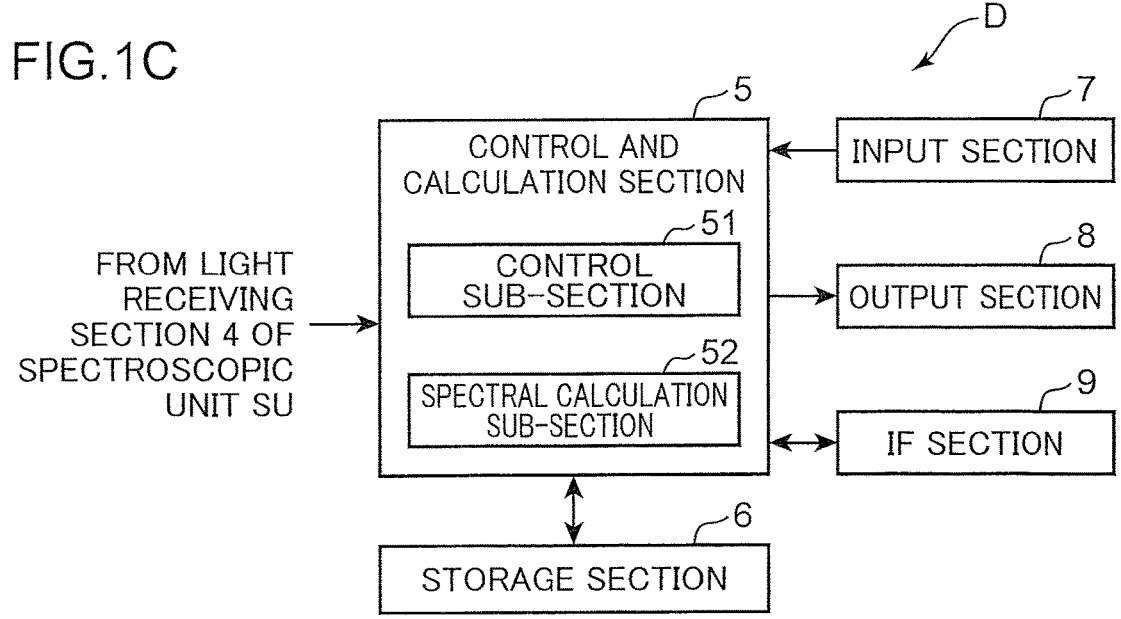
Figure 3A:
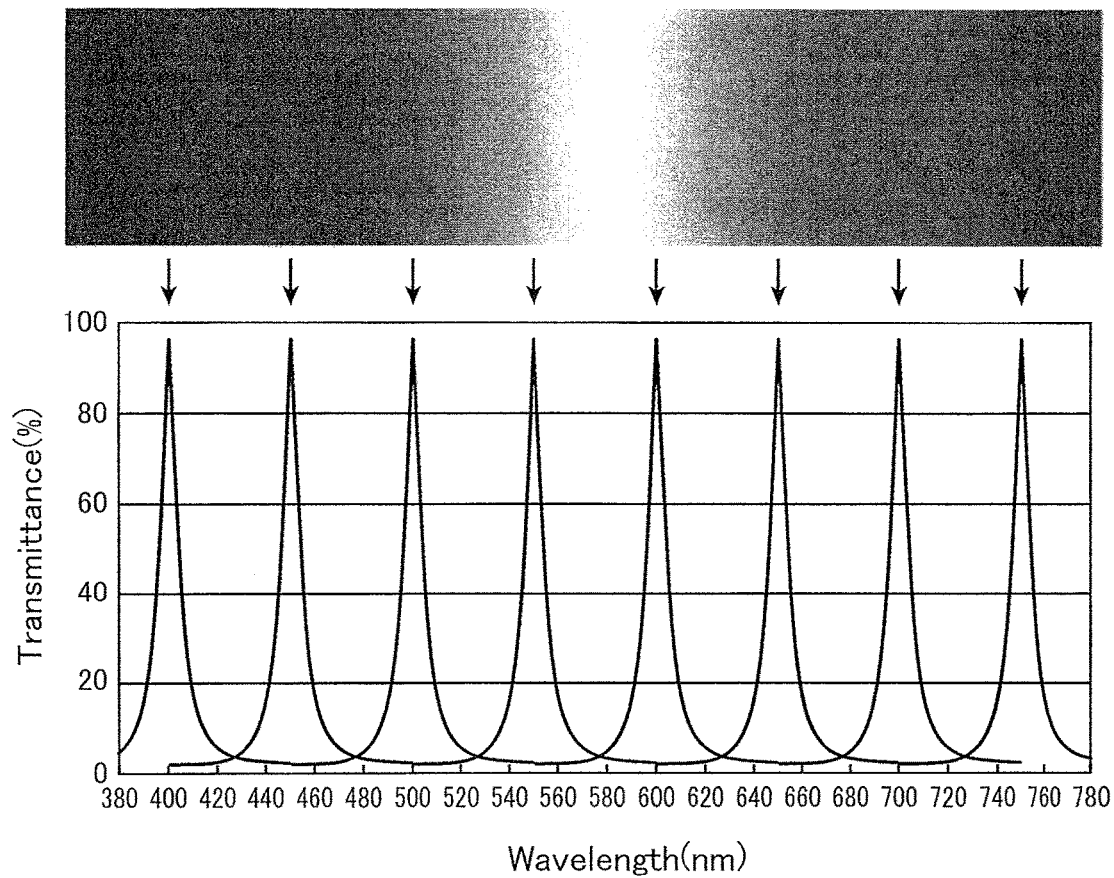
FIG. 3 is an explanatory diagram of a transmission wavelength characteristic of a linear variable filter in the spectroscopic device according to the first embodiment.
Figure 3B:
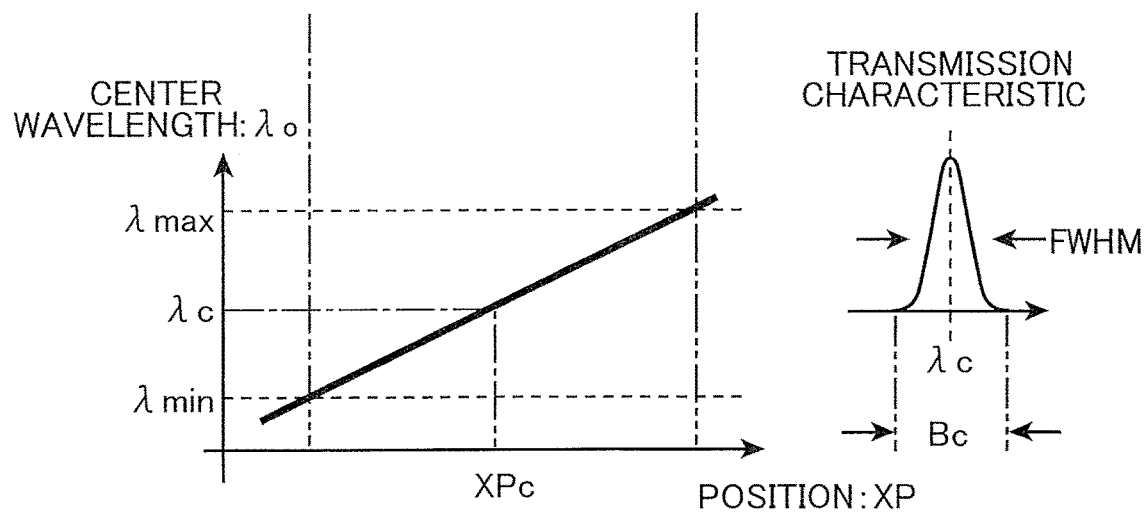

FIG. 1 is a diagram depicting a configuration of a spectroscopic device according to a first embodiment of the present invention. FIG. 1A and FIG. 1B depict, respectively, a side view of a spectroscopic unit and a top view of the spectroscopic unit, and FIG. 1C is a block diagram depicting an electrical configuration of the spectroscopic device. FIG. 2 is a fragmentary enlarged diagram depicting the configuration of the spectroscopic device according to the first embodiment. FIGS. 2A and 2C are top views, and FIGS. 2B and 2D are side views. FIGS. 2A and 2B depict a state of reflection within a filter 3, and FIGS. 2C and 2D depict a state of reflection between the filter 3 and a light-receiving section 4. FIG. 3 is an explanatory diagram of a transmission wavelength characteristic of a linear variable filter in the spectroscopic device according to the first embodiment. FIG. 3A depicts respective transmission wavelength sub-characteristic at a plurality of incident positions XPc, and FIG. 3B depicts a relationship between an incident position XPc and a center wavelength λc. In FIG. 3A, the horizontal axis represents a wavelength expressed in units of nm, and the vertical axis represents a transmittance expressed in units of %. In FIG. 3B, the horizontal axis represents an incident position XPc on a linear variable filter, and the vertical axis represents a center wavelength λc of a transmittance wavelength band corresponding to the incident position XPc. FIG. 4 is an explanatory diagram of a transmission wavelength characteristic of each type of filter constituting the linear variable filter in the spectroscopic device according to the first embodiment. FIG. 4A denotes respective transmission wavelength characteristics of bandpass filter, a short-pass filter and a long-pass filter, and FIG. 4B denotes a transmission wavelength characteristic obtained by synthesizing the three characteristics. In FIG. 4, the horizontal axis represents wavelength expressed in units of nm, and the vertical axis represents transmittance expressed in units of %.

The spectroscopic device according to the first embodiment is designed to measure a spectrum of target light to be measured, and includes: a spectroscopic unit for spectrally dispersing target light to be measured, on a wavelength-by-wavelength (wavenumber-by-wavenumber) basis, and outputting signals corresponding to respective intensities of received wavelength-separated light components; and a spectral calculation section for calculating respective intensities of the wavelength-separated light components (a distribution of intensity with respect to wavelength; a spectrum), based on the signals output from the light-receiving section. The target light includes one or more wavelengths a.

The spectroscopic device D according to the first embodiment includes, e.g., in this embodiment, a spectroscopic unit SU and a control and calculation section 5, as depicted in FIG. 1. In the embodiment depicted in FIG. 1, it further comprises a storage section 6, an input section 7, an output section 8, and an interface section (hereinafter abbreviated as "IF section") 9.

The spectroscopic unit SU is designed to spectrally disperse target light to be measured, on a wavelength-by-wavelength basis, and output signals corresponding to respective intensities of received wavelength-separated light components, and includes, e.g., in this embodiment, a filter 3 and a light-receiving section 4, as depicted in FIGS. 1A and 1B. In the embodiment depicted in FIGS. 1A and 1B, it further comprises an opening member 1 and an optical system 2. The opening member 1, the optical system 2, the filter 3 and the light-receiving section 4 are arranged in this order, i.e., in a direction of propagation of the target light, in such a manner that respective optical axes of them are coincident with an optical axis AX of the spectroscopic unit SU.

The opening member 1 has an opening for emitting target light to be entered into the spectroscopic unit SU, to an inside of the spectroscopic unit SU. As one example, the opening member 1 is a plate-shaped body which is made of a material capable of shielding the target light, and formed with a through-hole having a given shape (e.g., circular shape) to serve as the opening. The opening may be provided with a window member made of a light transmissive material. As another example, the opening member 1 is an optical fiber capable of guiding the target light, such as a single-core fiber or a multi-core fiber. In this case, one edge face of the optical fiber serves as the opening. The target light emitted from the opening of the opening member 1 to the inside of the spectroscopic unit SU is propagated while being diffused, and entered into the optical system 2.

The optical system 2 is designed to guide, to the filter 3, the target light emitted from the opening of the opening member 1 and entered into the optical system 2. The optical system 2 includes, e.g., in this embodiment, first to third cylindrical lenses 21, 22, 23. The first to third cylindrical lenses 21, 22, 23 are arranged in this order, i.e., sequentially arranged in a direction from an incident side toward an output side (in a direction of the propagation of the target light). The first and second cylindrical lenses 21, 22 are arranged such that curved surfaces thereof are opposed to each other in such a manner as to focus the target light only in an orthogonal direction as described in detail later, as depicted in FIG. 1A. The third cylindrical lens 23 is disposed such that a curved surface thereof faces the output side in such a manner as to collimate the target light only in a wavelength dispersion direction as described in detail later. Thus, the target light entered into the optical system 2 is output after being focused in the orthogonal direction while being collimated in the wavelength dispersion direction, through the optical system 2, and then entered into the filter 3.

The filter 3 is an optical element for spectrally dispersing the target light output from the optical system 2 and entered thereinto, on a wavelength-by-wavelength (wavenumber-by-wavenumber) basis, wherein a transmission wavelength of the optical element varies depending on an incident position along a first direction as a given one direction. This first direction is the aforementioned wavelength dispersion direction. The second direction extending from the incident side toward the output side of the target light is a direction of the optical axis AX of the optical system 2, and a third direction orthogonal to each of the first direction (wavelength dispersion direction) and the second direction (direction of the optical axis AX of the optical system 2) is the aforementioned orthogonal direction. The target light entered into the filter 3 is spectrally dispersed (wavelength-separated) by the filter 3, and a plurality of light components having different wavelengths a are output from the filter 3, and input into the light-receiving section 4.

More specifically, the filter 3 is constructed, e.g., in this embodiment, such that it has a linear variable filter (also called "sliding filter"; hereinafter appropriately abbreviated as "LVF"). The LVF is an optical element in which a center wavelength λc in a transmission wavelength characteristic (transmission wavelength band Bc) of an optical bandpass filter changes continuously and linearly depending on an incident position XPc, wherein the incident position XPc and the center wavelength λc in the transmission wavelength characteristic change in approximately proportional relation, as depicted in FIG. 3B. In FIG. 3B, for example, a light ray entered into a certain incident position XPc is formed as a light component in a wavelength band having a given full width at half maximum (FWHM) and a given center wavelength λc, and output from the incident position XPc. Thus, an overall transmission wavelength characteristic of the LVF 3 is formed by arranging, side-by-side in the one direction (first direction), a plurality of transmission wavelength sub-characteristics of a bandpass filter having different center wavelengths λc shifted in direct proportion to a variation in the incident position XPc, as depicted in FIG. 3A.

Generally, such an LVF is constructed by combining a plurality of optical filter elements together because it cannot be realized using a single optical filter element, for design or production reasons, as mentioned above. As one example, a bandpass filter-type LVF in which a plurality of transmission wavelength sub-characteristics of a bandpass filter having center wavelengths λc varied at respective incident positions XPc are arranged side-by-side in the one direction, is constructed, for example, by combining a stand-alone, bandpass filter-type LVF (BPF-LVF) element, with at least one of a short-pass filter-type LVF (SPF-LVF) element and a long-pass filter-type LVF (LPF-LVF) element. This is because the stand-alone, bandpass filter-type LVF (BPF-LVF) element has not only a primary transmission wavelength band but also an extra transmission wavelength band, and thereby it is necessary to cut off the unwanted transmission wavelength band using a different type of LVF element (SPF-LVF element and/or LPF-LVF element). For example, in an example depicted in FIG. 4A as indicated by the solid line, the stand-alone, bandpass filter-type LVF (BPF-LVF) element has not only a primary transmission wavelength band having a center wavelength of 535 nm but also an extra transmission wavelength band such as a wavelength band including a wavelength of about 450 nm as a center wavelength and a wavelength band including a wavelength of about 650 nm as a center wavelength, so that, in order to cut off the extra transmission wavelength band, the stand-alone, bandpass filter-type LVF (BPF-LVF) element is combined with a short-pass filter-type LVF (SPF-LVF) element having a transmission wavelength characteristic indicated by the broken line in FIG. 4A, and a long-pass filter-type LVF (LPF-LVF) element having a transmission wavelength characteristic indicated by the one-dot chain line in FIG. 4A. As a result of the combination, the bandpass filter-type LVF as the filter 3 is capable of realizing a transmission wavelength sub-characteristic at a certain incident position XPc, which has only a transmission wavelength band Bc having a center wavelength λc corresponding to the incident position XPc, as depicted in FIG. 4B.

The short-pass filter-type LVF (SPF-LVF) element is a stand-alone optical element in which a cutoff wavelength λco in a transmission wavelength characteristic (transmission wavelength band Bc) of an optical short-pass filter changes continuously and linearly depending on an incident position XPc. The short-pass filter (SPF) is operable to transmit therethrough light on a shorter wavelength side than the cutoff wavelength λco. That is, the short-pass filter is defined based on wavelength. On the other hand, if the filter is defined based on frequency, it is a high-pass filter operable to transmit therethrough light on a higher frequency side than a cutoff frequency fco. The long-pass filter-type LVF (LPF-LVF) element is a stand-alone optical element in which a cutoff wavelength λco in a transmission wavelength characteristic (transmission wavelength band Bc) of an optical long-pass filter changes continuously and linearly depending on an incident position XPc. The long-pass filter (LPF) is operable to transmit therethrough light on a longer wavelength side than the cutoff wavelength λco. That is, the long-pass filter is defined based on wavelength. On the other hand, if the filter is defined based on frequency, it is a low-pass filter operable to transmit therethrough light on a lower frequency side than a cutoff frequency fco.

As used in this specification, any stand-alone optical element having a filter characteristic is referred to as "filter element", and an optical element unit prepared by combining a plurality of optical elements together so as to realize a certain filter characteristic is referred to as "filter".

In this embodiment, in the filter 3 comprising a combination of the plurality of optical filter elements sequentially arranged in a direction from the incident side toward the output side of the target light, a first optical filter element as one of the plurality of optical filter elements is rotated, by a given angle, about a rotational axis defined along the third direction (orthogonal direction) orthogonal to each of the first direction (wavelength dispersion direction) and the second direction (direction of the optical axis AX) extending from the incident side toward the output side of the target light, or rotated, by a given angle, about a rotational axis defined along the first direction, and thereby disposed inclinedly with respect to a second optical filter element disposed in adjacent relation to the first optical filter element. In this way, the first optical filter element may be rotated about a rotational axis defined along the third direction by a given angle, and thereby disposed inclinedly. However, each of an LVF and a line sensor is generally formed in a rectangular parallelepiped shape which is long in the wavelength dispersion direction and short in a direction orthogonal to the wavelength dispersion direction. Thus, in the case where the rotational direction is defined along the third direction, it is necessary to set a relatively large inclination angle, as compared to the case where the rotational direction is defined along the first direction, so that a resulting filter is relatively increased in size and complicated in structure. Therefore, in this embodiment, the first optical filter element is rotated about a rotational axis defined along the first direction by a given angle, and thereby disposed inclinedly.

More specifically, as depicted in FIGS. 1 and 2, in this embodiment, the filter 3 is constructed such that it has two optical filter elements consisting of first and second optical filter elements 31, 32, wherein the first optical filter element 31 is a bandpass filter-type LVF (BPF-LVF) element which is rotated, by a given angle, about a rotational axis defined along the first direction, and thereby disposed inclinedly with respect to the second optical filter element 32 disposed in adjacent relation to the first optical filter element 31. Further, the second optical filter element 32 is a short-pass filter-type LVF (SPF-LVF) element or a long-pass filter-type LVF (LPF-LVF) element.

The above given angle is determined by a process generally including a first step of calculating an allowable reflection cycle number in multiple-reflection and a second step of calculating a required inclination angle, although this process will be described in detail later. In the first step, a relationship between a reflection cycle number in multiple-reflection and the stray light amount is derived using a maximum incident angle in the wavelength dispersion direction. In the second step, an inclination angle required for releasing stray light within the allowable reflection cycle number derived in the step 1 is derived using a maximum incident angle in the orthogonal direction along which stray light is most hardly released. In order to eliminate multiple-reflection in which the target light travels back and forth between the first and second optical filter elements 31, 32 N times or more, the above given angle is preferably set to satisfy the following conditional formulas (1) and (2), where: L1 denotes a distance between the first and second optical filter elements 31, 32; L2 denotes a distance between the filter 3 and the light-receiving section 4; X1 denotes a width of the filter 3 along the third direction; X2 denotes a width of the light-receiving section 4 along the third direction; ϕ denotes an orthogonal-directional maximum incident angle of the target light entering the second optical filter element 32; and θ denotes the given angle.

$$L_1 \tan\phi + 2L_1 \sum_{n=1}^{N-1} \tan(2n\theta + \phi) + L_2\tan(2N\theta + \phi) > \frac{x_1}{2} + \frac{x_2}{2} \quad (1)$$

$$L_2(\tan\phi + \tan(2\theta + \phi)) > x_2 \quad (2)$$

In the above formulas, the distance L1 is a so-called optical distance. In the case where a non-air medium exists (lies) between the first and second optical filter elements 31, 32, it is not a physical, actual length Lr1 but a dimension (air conversion length) obtained by converting the non-air medium to air, while taking into account a refractive index n1 of the non-air medium. Similarly, the distance L2 is a so-called optical distance. In the case where a non-air medium exists (lies) between the filter 3 and the light-receiving section 4, it is not a physical, actual length Lr2 but a dimension (air conversion length) obtained by converting the non-air medium to air, while taking into account a refractive index n2 of the non-air medium. The air conversion is performed by dividing the actual length Lr by the refractive index n of the non-air medium (L1=Lr1/n1, L1=Lr2/n2).

The light-receiving section 4 is a device into which the target light output from the filter 3 is entered, i.e., a device for receiving light components spectrally dispersed by the filter 3, i.e., wavelength-separated light components. More specifically, for example, the light-receiving section 4 includes a plurality of photoelectric conversion elements arranged side-by-side along the first direction (wavelength dispersion direction), wherein it is configured such that a plurality of light components having different wavelengths $\lambda k$ spectrally dispersed (wavelength-separated) by the filter 3 (wavelength-separated light components) are received, respectively, by the plurality of photoelectric conversion elements. Each of the photoelectric conversion elements is designed to convert optical energy to electrical energy, and is operable to output a current corresponding to a respective one of intensities (optical powers) of received light components. On the other hand, in the case where the light-receiving section 4 comprises a current-to-voltage conversion element for converting a current to a voltage (e.g., a resistive element), it is operable to output voltages corresponding to respective intensities of received light components. The light-receiving section 4 comprises, e.g., in this embodiment, a line sensor (photodiode array (PD array)) obtained by arranging a plurality of CCD (Charge Coupled Device)-type or CMOS (Complementary Metal Oxide Semiconductor)-type photoelectric conversion elements on a straight line. The light-receiving section 4 is disposed correspondingly to a layout position of the filter 3 to allow each of the photoelectric conversion elements (pixels) to receive a given one of the wavelengths preliminarily assigned thereto. That is, each of the photoelectric conversion elements is in one-to-one correspondence relation with a respective one of the center wavelengths $\lambda c$. The wavelength-separated light components entered into the light-receiving section 4 are subjected to photoelectric conversion through the photoelectric conversion elements of the light-receiving section 4. As a result, signals (current or voltage signals, or received light data) each having a magnitude corresponding to a respective one of the intensities of the received light components are output from the light-receiving section 4, and then input into the control and calculation section 5.

Further, in this embodiment, the light-receiving section 4 is installed such that a light-receiving surface thereof (a surface formed of respective light-receiving surfaces of the photoelectric conversion elements) becomes parallel to an output surface of the second optical filter element 32 of the filter 3. Thus, the first optical filter element 31 of the filter 3 is disposed inclinedly with respect to the light-receiving surface of the light-receiving section 4, in the same manner as that with respect to the second optical filter element 32. It should be understood that the first optical filter element 31 may be rotated, by the given angle, about a rotational axis defined along the third direction, or rotated, by the given angle, about a rotational axis defined along the first direction, and thereby disposed inclinedly with respect to the light-receiving surface of the light-receiving section 4.

The control and calculation section 5 is connected to the light-receiving section 4, and designed to control respective sections of the spectroscopic device D in conformity to functions of the sections so as to calculate a spectrum of the target light, and, based on signals (received light data) obtained by the light-receiving section 4, calculate respective intensities (spectrum) of wavelength-separated light components included in the target light. The control and calculation section 5 is constructed such that it includes a CPU (microcomputer) and its peripheral circuit. When a program is executed, a control sub-section 51 and a spectral calculation sub-section 52 are functionally created in the control and calculation section 5, as depicted in FIG. 1C. The control sub-section 51 is operable to control respective sections of the spectroscopic device D in conformity to functions of the sections so as to calculate a spectrum of the target light. The spectral calculation sub-section 52 is operable, based on signals (received light data) obtained by the light-receiving section 4, to calculate respective intensities (spectrum) of wavelength-separated light components included in the target light.

The storage section 6 is connected to the control and calculation section 5, and designed to store therein various programs such as a control program for controlling respective sections of the spectroscopic device D in conformity to functions of the sections, and a spectroscopic program for calculating respective intensities of wavelength-separated light components included in the target light; and various data such as data necessary for execution of the programs, data created during execution of the programs, signals (received light data) obtained by the light-receiving section 4. For example, the storage section 6 is constructed such that it includes: a non-volatile storage element, such as an ROM (Read Only Memory) or an EEPROM (Electrically Erasable Programmable Read Only Memory); a volatile storage element, such as an RAM (Random Access Memory) serving as a so-called "working memory" for the CPU (Central Processing Unit) in the control and calculation section 5; and a peripheral circuit thereof. The storage section 6 may further includes a relatively large-capacity storage device such as a hard disk, to store received light data and others output from the light-receiving section 4.

The input section 7 is a device connected to the control and calculation section 5 and designed to allow a user to input various commands such as a command for directing a start of measurement of target light, and various data necessary for spectrum measurement, such as an identifier of target light (sample). For example, it is composed of a keyboard, a mouse or the like. The output section 8 is a device for outputting a command and data input from the input section, and a spectrum of target light measured by the spectroscopic device D. For example, it is composed of: a display device such as a CRT display, an LCD or an organic EL display; a printing device such as a printer, or the like.

The input section 7 and the output section 8 may be constructed as a touch panel. In the case of constructing such a touch panel, the input section 7 serves as a resistive or capacitive-type position input device for detecting and inputting an operated position, and the output section 8 serves as a display device. In this touch panel, the position input device is provided on a display surface of the display device on which one or more candidates for input content inputtable into the display device are displayed. When a user touches a position of the display surface at which an input content the user wants to input is displayed, the touched position is detected by the position input device, and the content displayed at the detected position is input into the spectroscopic device D, as an input content operated by the user. Such a touch panel allows a user to intuitively understand an input operation, so that it is possible to provide a spectroscopic device D which is easy to handle for a user.

The IF section 9 is a circuit connected to the control and calculation section 5 and designed to perform input and output of data with respect to an external device. For example, it is composed of: an interface circuit conforming to the serial communication standard RS-232C; an interface circuit conforming to the Bluetooth (trademark) standard; an interface circuit for infrared communication conforming to the IrDA (Infrared Data Association) standard or the like; an interface circuit conforming to the USB (Universal Serial Bus) standard.

In the above spectroscopic device D, target light to be measured is entered from the opening of the opening member 1 to the spectroscopic device D, and entered into the optical system 2. The target light entered into the optical system 2 is collimated in the wavelength dispersion direction (first direction) to form parallel light, while being focused in the orthogonal direction (third direction), and entered into the filter 3. Then, the target light entered from the optical system 2 into the filter 3 is spectrally dispersed depending on incident positions Xn, and entered into the light-receiving section 4 in the form of a plurality of light components having different wavelengths (wavelength-separated light components). The light components entered into the light-receiving section 4 are received, respectively, by the plurality of photoelectric conversion elements, and subjected to photoelectric conversion. Thus, the light components entered into the light-receiving section 4 are output from the light-receiving section 4 in the form of a plurality of electrical signals corresponding to respective intensities of the light components. The signals (received light data) output from the light-receiving section 4 are input into the control and calculation section 5, and stored in the storage section 6. The control and calculation section 5 operates to subject the signal data (received light data) stored in the storage section 6 using heretofore-known commonly-used means, to signal processing to calculate a spectrum of the target light. Then, the control and calculation section 5 operates to store the obtained spectrum of the target light in the storage section 6 as needed basis, or output the obtained spectrum of the target light to the output section 8 or the IF section 9 as needed basis.

Next, the aforementioned given angle in the spectroscopic unit SU and the spectroscopic device D using the spectroscopic unit SU will be described in detail.

<In-Filter Multiple-Reflection: Multiple-Reflection Between BPF-LVF Element and LPF-LVF Element>

First of all, on an assumption that the filter 3 comprises a BPF-LVF element and an LPF-LVF element, multiple-reflection occurring between the BPF-LVF element and the LPF-LVF element will be described.

Figure 5:
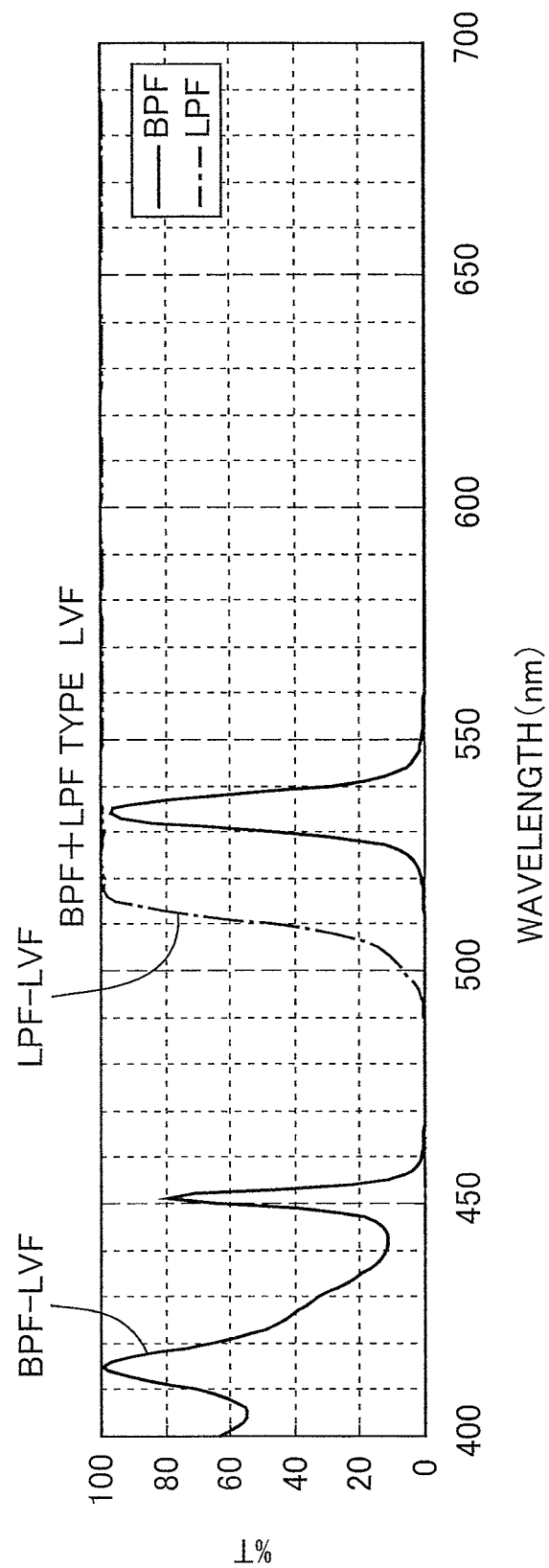
FIG. 5 is a diagram depicting a transmission wavelength characteristic of an LVF at an incident position corresponding to a transmission wavelength band having a center wavelength of 535 nm.
Figure 6A:
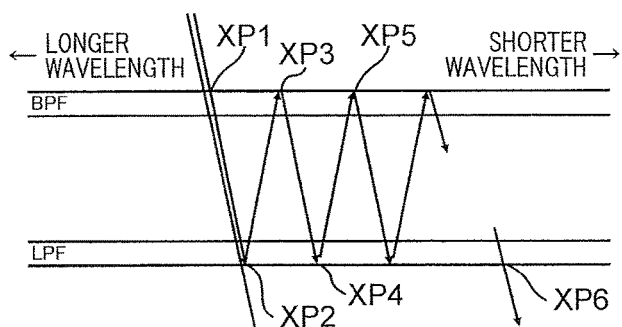
FIG. 6 is an explanatory diagram of a relationship between multiple-reflection of obliquely-incident light, and receiving of a light component in a wavelength band other than a specific wavelength band to be essentially received by each light-receiving element.
Figure 6B:
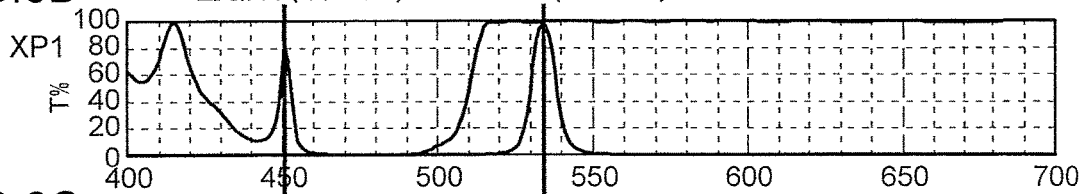
Figure 6C:
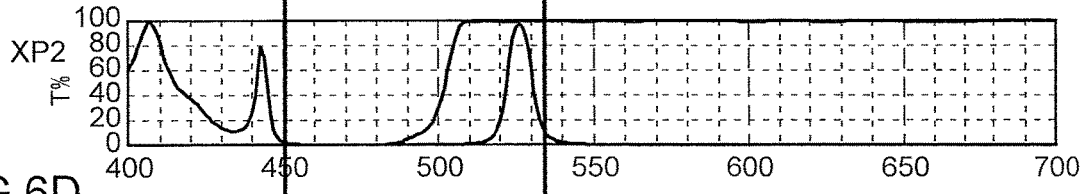

FIG. 5 is a diagram depicting a transmission wavelength characteristic of the LVF at an incident position corresponding to a transmission wavelength band having a center wavelength of 535 nm. In FIG. 5, the horizontal axis represents a wavelength expressed in units of nm, and the vertical axis represents a transmittance expressed in units of %. FIG. 6 is an explanatory diagram of a relationship between multiple-reflection of obliquely-incident light, and receiving of a light component in a wavelength band other than a specific wavelength band to be essentially received by each light receiving element. FIG. 6A is an explanatory diagram of a state of multiple-reflection, and FIGS. 6B to 6G are diagrams depicting respective transmission wavelength characteristics at incident positions XP1 to XP6 on the LVF depicted in FIG. 6A.

In the LVF composed of the BPF-LVF element and the LPF-LVF element, at an incident position XP1 corresponding to a transmission wavelength band having a center wavelength of 535 nm, the BPF-LVF element has not only the transmission wavelength band having a center wavelength of 535 nm but also a transmission wavelength band having a center wavelength of about 450 nm, as depicted in FIG. 5. In the LVF, the transmission wavelength band having a center wavelength of about 450 nm (unwanted transmission light) is cut off by the LPF-LVF element.

When target light enters the LVF, at the incident position XP1 corresponding to the transmission wavelength band having a center wavelength of 535 nm, firstly, a light component of the target light having a wavelength of 535 nm is sequentially transmitted through the BPF-LVF element and the LPF-LVF element, and received by one of the photoelectric conversion elements of the light-receiving section 4 preliminarily allocated to receive a light component in a wavelength band having a center wavelength of 535 nm.

Figure 6D:
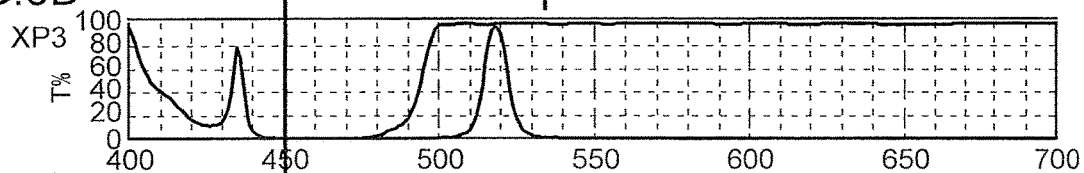
Figure 6E:
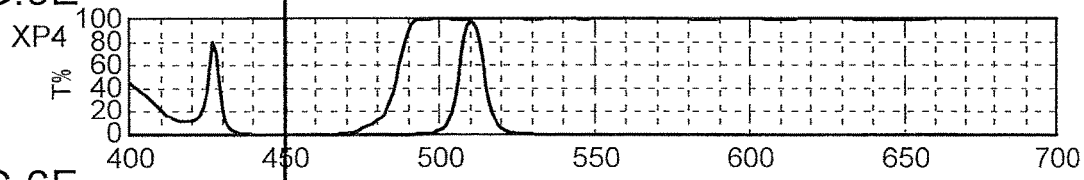
Figure 6F:
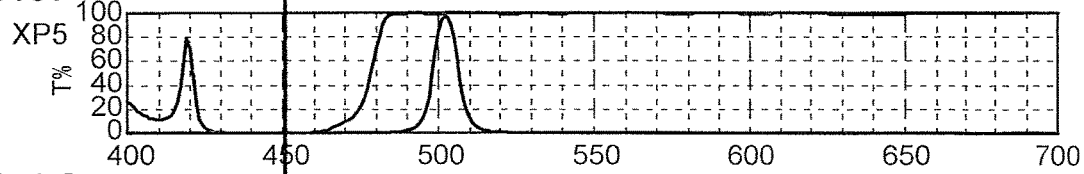
Figure 6G:
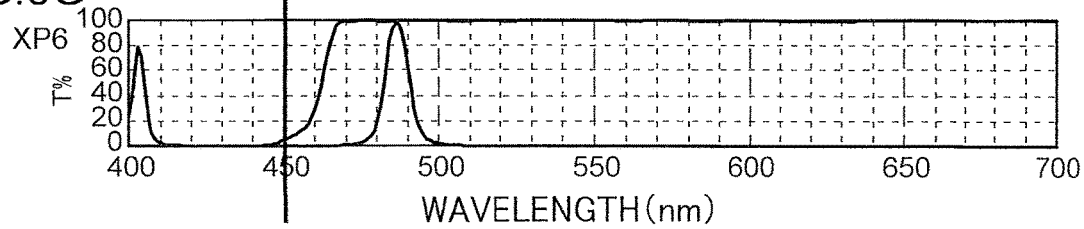

On the other hand, although a light component of the target light having a wavelength of about 450 nm is transmitted through the BPF-LVF element, it cannot be transmitted through the LPF-LVF element and thereby reflected to travel toward the BPF-LVF element. In this process, when an incident angle of the target light is 0 degree, the about 450 nm wavelength light component of the target light enters the incident position XP1 of the LPF-LVF element, and is reflected according to the transmission wavelength characteristic depicted in FIG. 6B. The about 450 nm wavelength light component reflected at the incident position XP1 of the LPF-LVF element is returned to the incident position XP1 of the BPF-LVF element, and directly transmitted through the BPF-LVF element, so that no multiple-reflection occurs. Differently, as depicted in FIG. 6A, in the case of oblique incidence, the about 450 nm wavelength light component of the target light enters an incident position XP2 of the LPF-LVF element on a short wavelength side of the incident position XP1, and is reflected according to the transmission wavelength characteristic depicted in FIG. 6C, to travel toward the BPF-LVF element. The about 450 nm wavelength light component reflected at the incident position XP2 of the LPF-LVF element enters an incident position XP3 shifted on the short wavelength side. At the incident position XP3, the BPF-LVF element having LVF characteristics exhibits a transmission wavelength band having a center wavelength of about 518 nm corresponding to the incident position XP3, as depicted in FIG. 6D, so that the reflected light component having a wavelength of about 450 nm is reflected again to travel toward the LPF-LVF element. The about 450 nm wavelength light component reflected at the incident position XP3 enters an incident position XP4 of the LPF-LVF element on the short wavelength side of the incident position XP3, and is reflected again according to the transmission wavelength characteristic depicted in FIG. 6E, to travel toward the BPF-LVF element. In this way, the obliquely-incident light component with a wavelength of about 450 nm is multiple-reflected between the BPF-LVF element and the LPF-LVF element, and propagated toward a shorter wavelength side through a space between the BPF-LVF element and the LPF-LVF element. Along with propagation toward a shorter wavelength side, a cutoff wavelength of the LPF-LVF element having LVF characteristics is shifted toward a shorter wavelength side, so that the LPF-LVF element eventually allows the about 450 nm wavelength light component to be transmitted therethrough at an incident position XP6, as depicted in FIG. 6G. As a result, the about 450 nm wavelength light component subjected to multiple-reflection is received by one of the photoelectric conversion elements of the light-receiving section 4 corresponding to the incident position XP6. Therefore, the photoelectric conversion element of the light-receiving section 4 corresponding to the incident position XP6 receives a light component in a wavelength band other than a specific wavelength band assignee thereto and to be essentially received thereby, so that an output from this photoelectric conversion element will undesirably include an error.

<In-Filter Multiple-Reflection: Multiple-Reflection between BPF-LVF Element and SPF-LVF Element>

Next, on an assumption that the filter 3 has a BPF-LVF element and an SPF-LVF element, multiple-reflection occurring between the BPF-LVF element and the SPF-LVF element will be described.

Figure 8A:
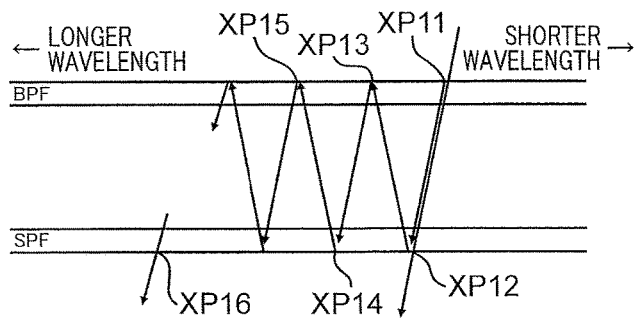
FIG. 8 is an explanatory diagram of a relationship between multiple-reflection of obliquely-incident light, and receiving of a light component in a wavelength band other than a specific wavelength band to be essentially received by each light-receiving element.
Figure 8B:
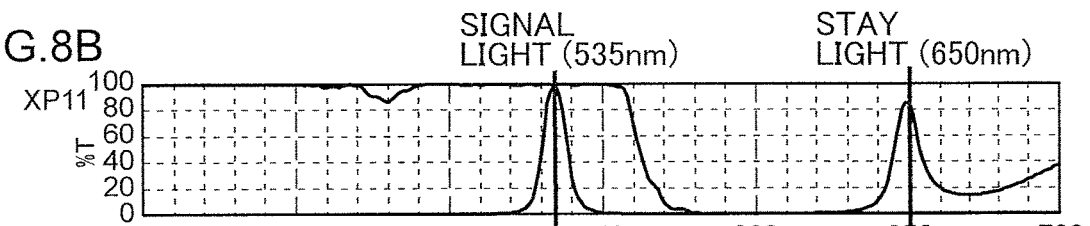
Figure 8C:
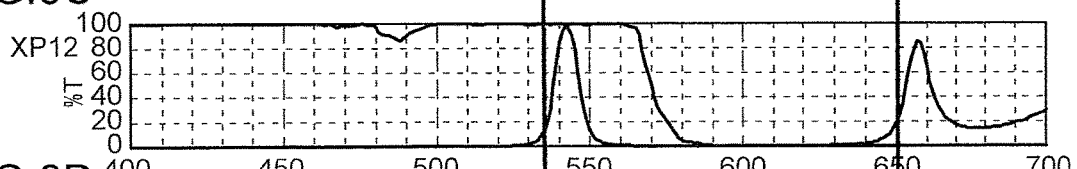

FIG. 7 is a diagram depicting a transmission wavelength characteristic of the LVF at an incident position corresponding to a transmission wavelength band having a center wavelength of 535 nm. In FIG. 7, the horizontal axis represents a wavelength expressed in units of nm, and the vertical axis represents a transmittance expressed in units of %. FIG. 8 is an explanatory diagram of a relationship between multiple-reflection of obliquely-incident light, and receiving of a light component in a wavelength band other than a specific wavelength band to be essentially received by each light receiving element. FIG. 8A is an explanatory diagram of a state of multiple-reflection, and FIGS. 8B to 8G are diagrams depicting respective transmission wavelength characteristics at incident positions XP11 to XP16 on the LVF depicted in FIG. 8A.

In the LVF composed of the BPF-LVF element and the SPF-LVF element, at an incident position XP11 corresponding to a transmission wavelength band having a center wavelength of 535 nm, the BPF-LVF element has not only the transmission wavelength band having a center wavelength of 535 nm but also a transmission wavelength band having a center wavelength of about 650 nm, as depicted in FIG. 7. In the LVF, the transmission wavelength band having a center wavelength of about 650 nm (unwanted transmission light) is cut off by the SPF-LVF element.

When target light enters the LVF, at the incident position XP11 corresponding to the transmission wavelength band having a center wavelength of 535 nm, firstly, a light component of the target light having a wavelength of 535 nm is sequentially transmitted through the BPF-LVF element and the SPF-LVF element, and received by one of the photoelectric conversion elements of the light-receiving section 4 preliminarily allocated to receive a light component in a wavelength band having a center wavelength of 535 nm.

Figure 8D:
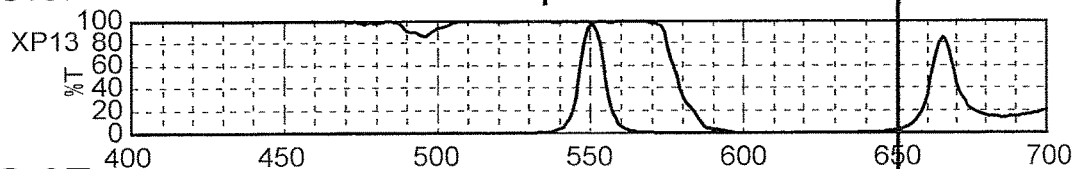
Figure 8E:
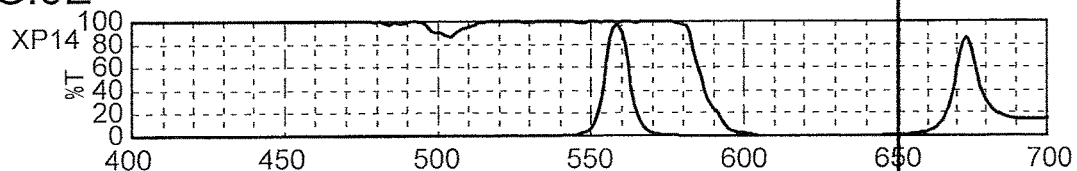
Figure 8F:
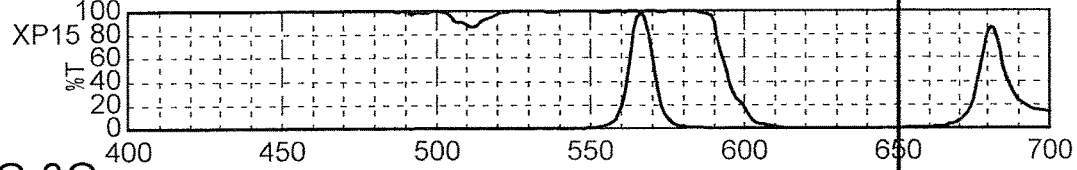
Figure 8G:
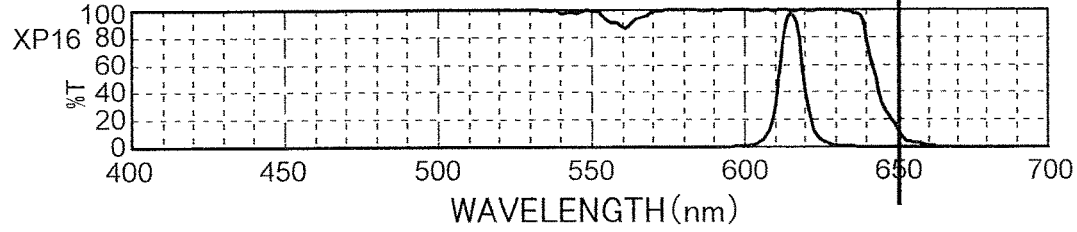

On the other hand, although a light component of the target light having a wavelength of about 650 nm is transmitted through the BPF-LVF element, it cannot be transmitted through the SPF-LVF element and thereby reflected to travel toward the BPF-LVF element. In this process, when an incident angle of the target light is 0 degree, the about 650 nm wavelength light component of the target light enters the incident position XP11 of the SPF-LVF element, and is reflected according to the transmission wavelength characteristic depicted in FIG. 8B. The about 650 nm wavelength light component reflected at the incident position XP11 of the LPF SPF-LVF element is returned to the incident position XP11 of the BPF-LVF element, and directly transmitted through the BPF-LVF element, so that no multiple-reflection occurs. Differently, as depicted in FIG. 8A, in the case of oblique incidence, the about 650 nm wavelength light component of the target light enters an incident position XP12 of the SPF-LVF element on a long wavelength side of the incident position XP11, and is reflected according to the transmission wavelength characteristic depicted in FIG. 8C, to travel toward the BPF-LVF element. The about 650 nm wavelength light component reflected at the incident position XP12 of the SPF-LVF element enters an incident position XP13 shifted on the long wavelength side. At the incident position XP13, the BPF-LVF element having LVF characteristics exhibits a transmission wavelength band having a center wavelength of about 550 nm corresponding to the incident position XP13, as depicted in FIG. 8D, so that the reflected light component having a wavelength of about 650 nm is reflected again to travel toward the SPF-LVF element. The about 650 nm wavelength light component reflected at the incident position XP13 enters an incident position XP14 of the SPF-LVF element on the long wavelength side of the incident position XP13, and is reflected again according to the transmission wavelength characteristic depicted in FIG. 8E, to travel toward the BPF-LVF element. In this way, the obliquely-incident light component with a wavelength of about 650 nm is multiple-reflected between the BPF-LVF element and the SPF-LVF element, and propagated toward a longer wavelength side through a space between the BPF-LVF element and the SPF-LVF element. Along with propagation toward a longer wavelength side, a cutoff wavelength of the SPF-LVF element having LVF characteristics is shifted toward a longer wavelength side, so that the SPF-LVF element eventually allows the about 650 nm wavelength light component to be transmitted therethrough at an incident position XP16, as depicted in FIG. 8G. As a result, the about 650 nm wavelength light component subjected to multiple-reflection is received by one of the photoelectric conversion elements of the light-receiving section 4 corresponding to the incident position XP16. Therefore, the photoelectric conversion element of the light-receiving section 4 corresponding to the incident position XP16 receives a light component in a wavelength band other than a specific wavelength band assignee thereto and to be essentially received thereby, so that an output from this photoelectric conversion element will undesirably include an error.

<Measures Against in-Filter Multiple-Reflection and the Given Angle>

As means to reduce such multiple-reflection, it is conceivable to use a collimator lens having a relatively long focal length to provide enhanced collimatability for target light to be entered into the filter 3 to thereby reduce obliquely-incident light responsible for multiple-reflection. However, assuming that a filter size is fixed, an aperture angle in the optical system in the wavelength dispersion direction becomes smaller along with an increase in the focal length, so that an amount of light entering the spectroscopic unit SU or the spectroscopic device D is reduced, resulting in deteriorated SN ratio in measurement. Moreover, the increase in focal length leads to an increase in size of the spectroscopic unit SU and the spectroscopic device D. In the case where the size of the incident aperture is relatively large, or there are a plurality of incident apertures, an influence thereof becomes more prominent.

Therefore, as mentioned above, in the spectroscopic unit SU and the spectroscopic device D according to this embodiment, the first optical filter element 31 of the filter 3 is rotated, by a given angle, about a rotational axis defined along the third direction or the first direction, and thereby disposed inclinedly with respect to the second optical filter element 32. Further, in this embodiment, the first optical filter element 31 of the filter 3 is rotated, by a given angle, about a rotational axis defined along the third direction or the first direction, and thereby disposed inclinedly with respect to the light-receiving surface of the light-receiving section 4. Preferably, the given angle is set in the following manner. Although the following description will be made by taking as an example the case where the rotational axis is defined along the first direction, it should be noted that the same calculational method can also be applied to the case where the rotational axis is defined along the third direction.

Considering the aforementioned process in which due to multiple-reflection, the photoelectric conversion element undesirably receives a light component in a wavelength band other than a specific wavelength band to be essentially received thereby, a numerical experiment (simulation) about a relationship between the reflection cycle number in multiple-reflection and a stray light amount was performed. As to the reflection cycle number in multiple-reflection, when target light entered from the BPF-LVF element is reflected by the LPF-LVF element (or the SPF-LVF element) and returned to the BPF-LVF element again, the back-and-forth travel is counted as one time (one cycle). Thus, the case where the reflection cycle number is 0 means that target light is directly transmitted through the filter 3 without any reflection within the filter 3.

Figure 9:
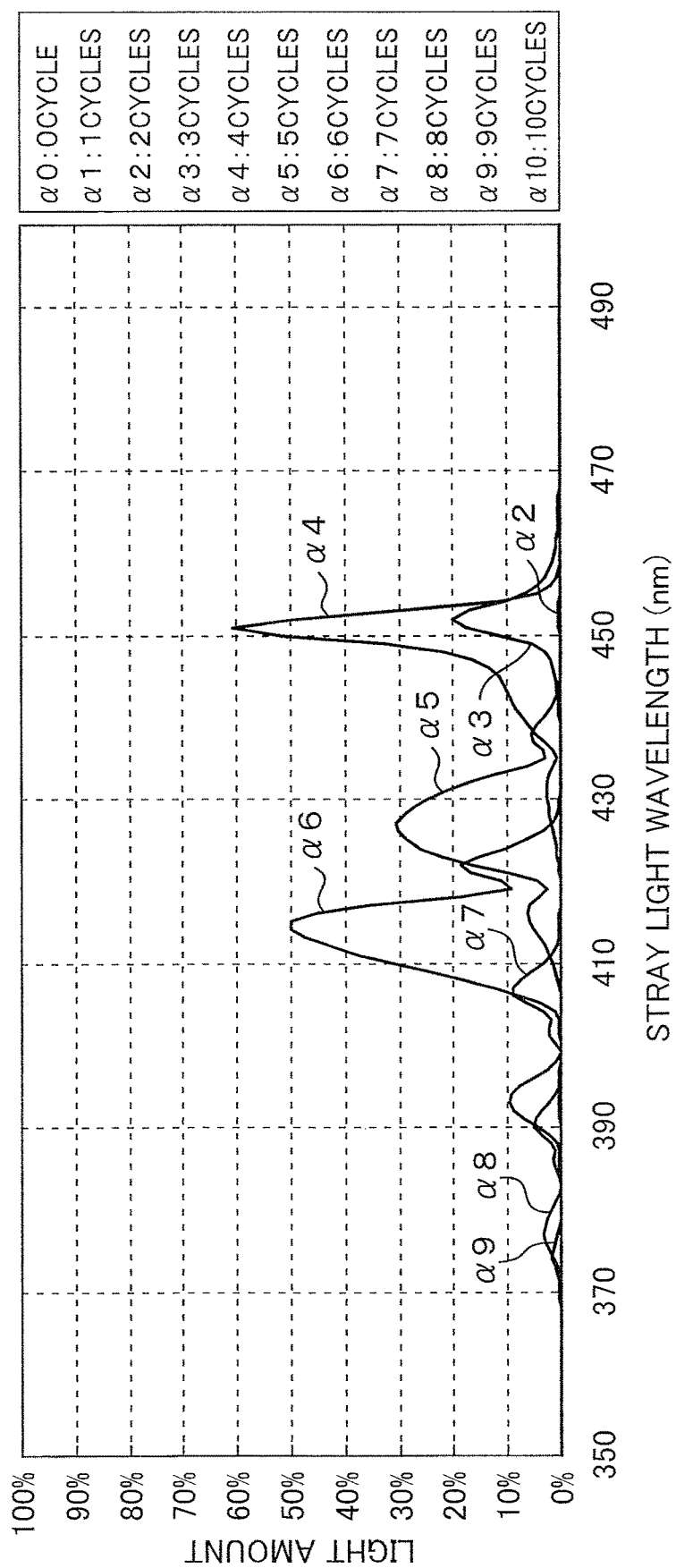
FIG. 9 is a diagram depicting a relationship between a stray light wavelength and a stray light amount, with respect to each reflection cycle number in multiple-reflection, in an LVF composed of a BPF-LVF element and an LPF-LVF element.
Figure 10:
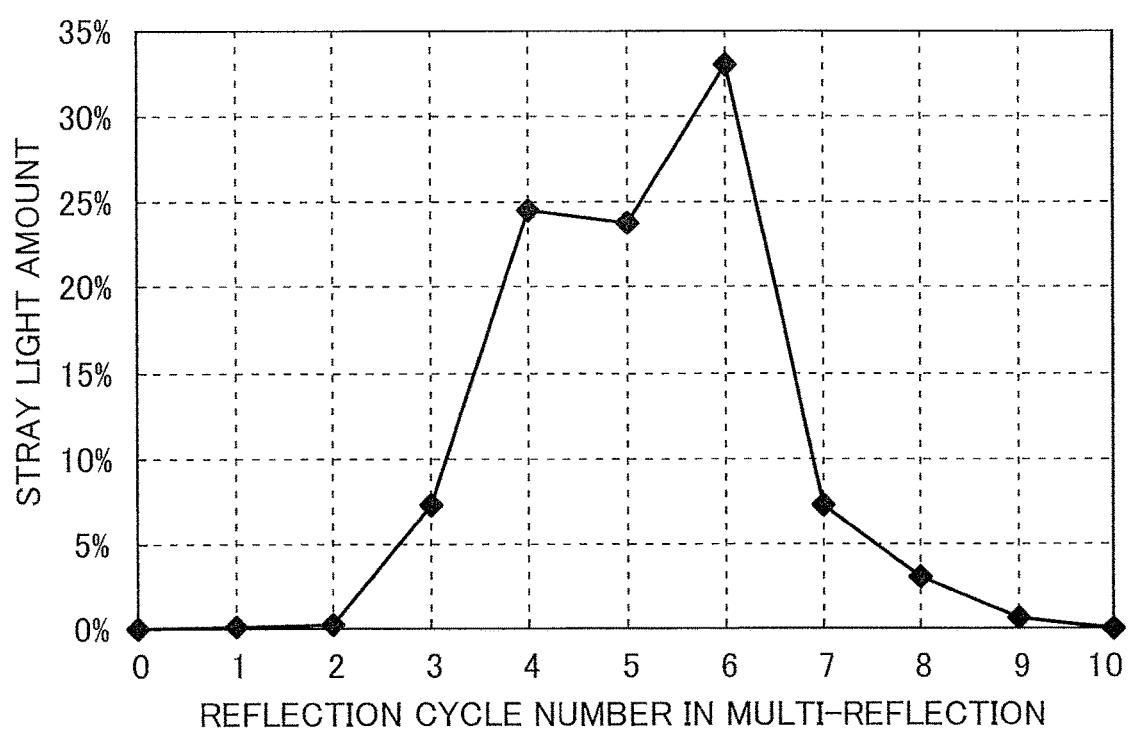
FIG. 10 is a diagram depicting a relationship between the reflection cycle number in multiple-reflection and the stray light amount, in the LVF composed of the BPF-LVF element and the LPF-LVF element.
Figure 11:
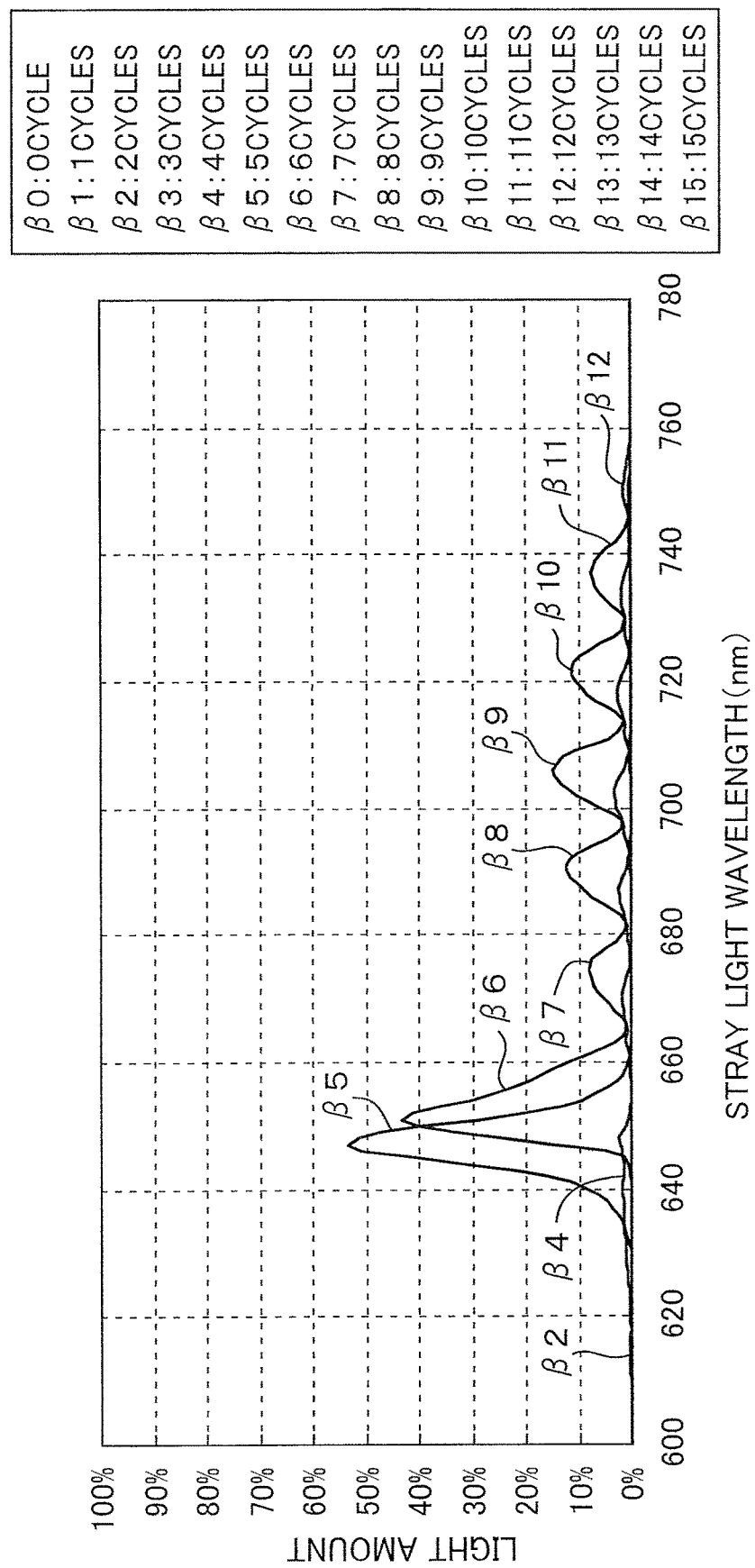
FIG. 11 is a diagram depicting a relationship between the stray light wavelength and the stray light amount, with respect to each reflection cycle number in multiple-reflection, in an LVF composed of a BPF-LVF element and an SPF-LVF element.
Figure 12:
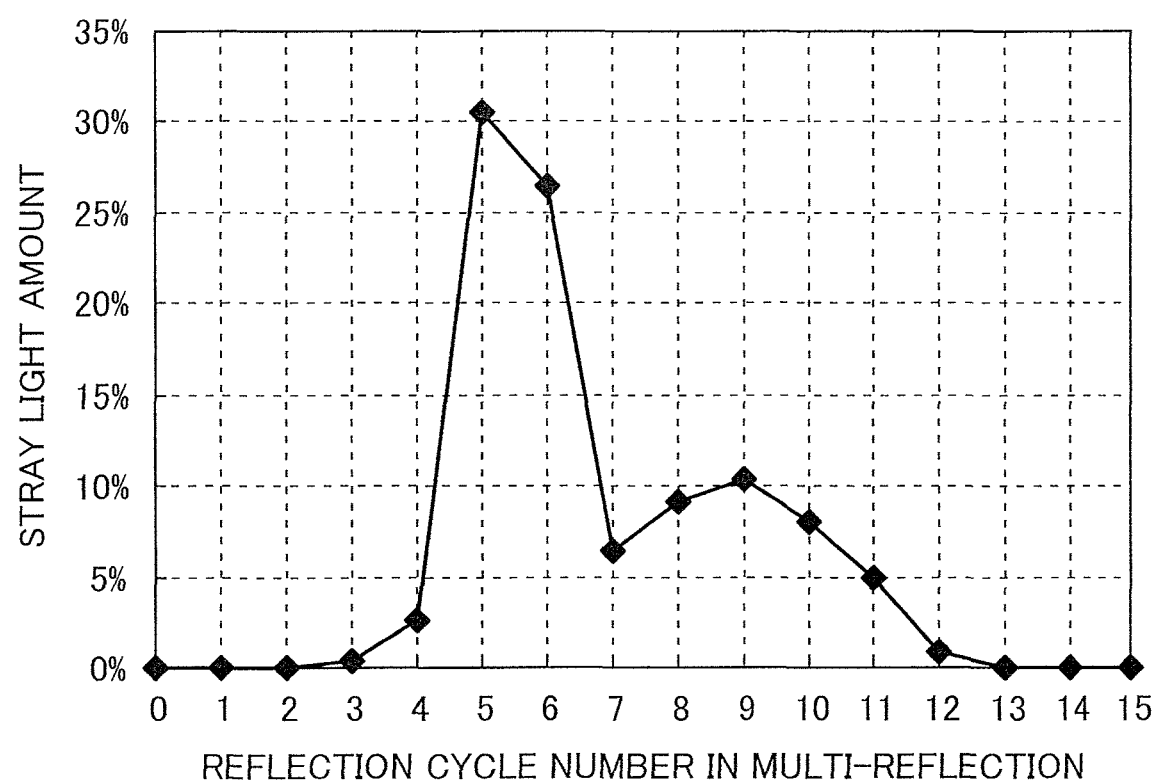
FIG. 12 is a diagram depicting a relationship between the reflection cycle number in multiple-reflection and the stray light amount, in the LVF composed of the BPF-LVF element and the SPF-LVF element.
Figure 13A:
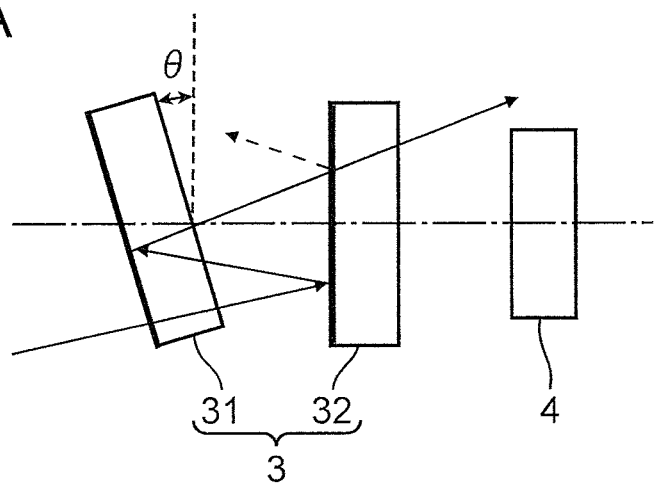
FIG. 13 is an explanatory diagram of a relationship between an allowable reflection cycle number in multiple-reflection, and an inclination angle in a first optical filter element.
Figure 13B:
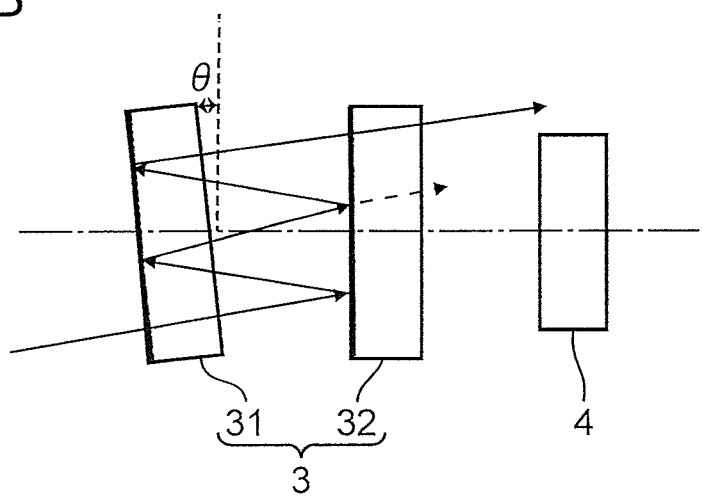

FIG. 9 is a diagram depicting the relationship between a stray light wavelength and the stray light amount, with respect to each reflection cycle number in multiple-reflection, in an LVF composed of a BPF-LVF element and an LPF-LVF element. FIG. 10 is a diagram depicting a relationship between the reflection cycle number in multiple-reflection and the stray light amount, in the LVF composed of the BPF-LVF element and the LPF-LVF element. FIG. 11 is a diagram depicting a relationship between the stray light wavelength and the stray light amount, with respect to each reflection cycle number in multiple-reflection, in an LVF composed of a BPF-LVF element and an SPF-LVF element. FIG. 12 is a diagram depicting a relationship between the reflection cycle number in multiple-reflection and the stray light amount, in the LVF composed of the BPF-LVF element and the SPF-LVF element. In FIGS. 9 and 11, the horizontal axis represents the stray light wavelength expressed in units of nm, and the vertical axis represents the stray light amount expressed in units of %. In FIGS. 10 and 12, the horizontal axis represents the reflection cycle number, and the vertical axis represents the stray light amount expressed in units of %. FIG. 13 is an explanatory diagram of a relationship between an allowable reflection cycle number in multiple-reflection, and an inclination angle in the first optical filter element. FIG. 13A depicts the case where the allowable reflection cycle number is one, and FIG. 13B depicts the case where the allowable reflection cycle number is two.

In the LVF composed of the BPF-LVF element and the LPF-LVF element having the transmission wavelength characteristics depicted in FIG. 5, assume that: the distance (air conversion length) L1 between the BPF-LVF element and the LPF-LVF element is 1.5 mm; a linearity in the BPF-LVF element is 20 nm/mm; and an maximum incident angle with respect to the BPF-LVF element in the wavelength dispersion direction is 15 degrees. On the basis of this assumption and the aforementioned multiple-reflection process, the relationship between the stray light wavelength and the stray light amount was numerically calculated with respect to each reflection cycle number in multiple-reflection. Results of the numerical calculation are depicted in FIG. 9 and FIG. 10. As is evident from FIG. 10, in a multiple-reflection having 0 to 2 reflection cycles, the stray light amount is small, whereas, in a multiple-reflection having 3 reflection cycles or more, the stray light amount is relatively large. Thus, it is desirable to reduce the multiple-reflection having 3 reflection cycles or more. FIGS. 9 and 10 depict numerical calculation results on the assumption that the incident angle is 15 degrees. Considering the aforementioned multiple-reflection process, the reflection cycle number increases as the incident angle comes closer to 0.

In the LVF composed of the BPF-LVF element and the SPF-LVF element having the transmission wavelength characteristics depicted in FIG. 7, assume that: the distance (air conversion length) L1 between the BPF-LVF element and the SPF-LVF element is 1.5 mm; the linearity in the BPF-LVF element is 20 nm/mm; and the maximum incident angle with respect to the BPF-LVF element in the wavelength dispersion direction is 15 degrees. On the basis of this assumption and the aforementioned multiple-reflection process, the relationship between the stray light wavelength and the stray light amount was numerically calculated with respect to each reflection cycle number in multiple-reflection. Results of the numerical calculation are depicted in FIG. 11 and FIG. 12. As is evident from FIG. 12, in a multiple-reflection having 0 to 3 reflection cycles, the stray light amount is small, whereas, in a multiple-reflection having 4 reflection cycles or more, the stray light amount is relatively large. Thus, it is desirable to reduce a multiple-reflection having 4 reflection cycles or more. FIGS. 11 and 12 depict numerical calculation results on the assumption that the incident angle is 15 degrees. Considering the aforementioned multiple-reflection process, the reflection cycle number increases as the incident angle comes closer to 0.

Thus, in this example, in the case where an incident angle of target light with respect to the filter is 15 degrees, when the first optical filter element (BPF-LVF element) is disposed inclinedly at an angle which causes the reflection cycle number to become less than 3, it becomes possible to reduce stray light.

While the reflection cycle number in multiple-reflection depends on the respective transmission wavelength characteristics of the LVF elements of the LVF, it also depends on the incident angle, i.e., the given angle (inclination angle) θ of the first optical filter element 31. Thus, conversely, the given angle θ of the first optical filter element 31 depends on the allowable reflection cycle number in multiple-reflection.

For example, when it is necessary to eliminate stray light after only one reflection cycle, as depicted in FIG. 13A, the given angle θ1 is expressed as the following formula (1a). On the other hand, when it is necessary to eliminate stray light after two reflection cycles, as depicted in FIG. 13B, the given angle θ2 is expressed as the following formula (1b).

$$L_1 \tan\phi + L_2 \tan(2\theta_1 + \phi) > \frac{x_1}{2} + \frac{x_2}{2} \quad (1a)$$

$$L_1 \tan\phi + 2L_1 \tan(2\theta_2 + \phi) + L_2 \tan(4\theta_2 + \phi) > \frac{x_1}{2} + \frac{x_2}{2} \quad (1b)$$

As other examples, when it is necessary to eliminate stray light after three reflection cycles, the given angle θ3 is expressed as the following formula (1c), and, when it is necessary to eliminate stray light after four reflection cycles, the given angle θ4 is expressed as the following formula (1d). Further, when it is necessary to eliminate stray light after five reflection cycles, the given angle θ5 is expressed as the following formula (1e). Generally, when it is necessary to eliminate stray light after N reflection cycles, the given angle θ is expressed as the aforementioned formula (1)

$$L_1 \tan\phi + 2L_1 \tan(2\theta_3 + \phi) + \\ 2L_1 \tan(4\theta_3 + \phi) + L_2 \tan(6\theta_3 + \phi) > \frac{x_1}{2} + \frac{x_2}{2} \quad (1c)$$

$$L_1 \tan\phi + 2L_1 \tan(2\theta_4 + \phi) + 2L_1 \tan(4\theta_4 + \phi) + \\ 2L_1 \tan(6\theta_4 + \phi) + L_2 \tan(8\theta_4 + \phi) > \frac{x_1}{2} + \frac{x_2}{2} \quad (1d)$$

$$L_1 \tan\phi + 2L_1 \tan(2\theta_5 + \phi) + 2L_1 \tan(4\theta_5 + \phi) + 2L_1 \tan(6\theta_5 + \phi) + \\ 2L_1 \tan(8\theta_5 + \phi) + L_2 \tan(10\theta_5 + \phi) > \frac{x_1}{2} + \frac{x_2}{2} \quad (1e)$$

As is evident from the above formulas (1) and (1a) to (1e), the given angle (inclination angle) θ becomes smaller along with an increase in the allowable reflection cycle number in multiple-reflection. However, as is evident from FIGS. 9 and 12, the stray light amount becomes larger along with an increase in the allowable reflection cycle number in multiple-reflection, as mentioned above. Therefore, the allowable reflection cycle number in multiple-reflection is determined by an allowable stray light amount determined by specifications (e.g., measurement accuracy or the like) of the spectroscopic unit SU and the spectroscopic device D, and then the given angle θ is designed according to the determined allowable reflection cycle number in multiple-reflection and based on the formula (1).

As one example, assuming the following conditions: the use of the LVF composed of the BPF-LVF element and the LPF-LVF element having the transmission wavelength characteristics depicted in FIG. 5; the distance L1=1.5 mm; the distance L2=4.3 mm; the width X1=3.0 mm; the width X2=2.0 mm; and the orthogonal directional maximum incident angle ϕ=15 degrees, the reflection cycle number (cycle) in multiple-reflection to be eliminated, a required inclination angle (the given angle) θ (degree) and an achievable stray light amount (%) are presented in the following Table 1. As another example, assuming the following conditions: the use of the LVF composed of the BPF-LVF element and the SPF-LVF element having the transmission wavelength characteristics depicted in FIG. 7; the distance L1=1.5 mm; the distance L2=4.3 mm; the width X1=3.0 mm; the width X2=2.0 mm; and the orthogonal directional maximum incident angle ϕ=15 degrees, the reflection cycle number (cycle) in multiple-reflection to be eliminated, the required inclination angle (the given angle) θ (degree) and the achievable stray light amount (%) are presented in the following Table 2.

TABLE 1

| Multiple-reflection to be eliminated | Required inclination angle θ | Achievable stray light amount |
| --- | --- | --- |
| 1 cycle or more | 25 | 0.01% |
| 2 cycle or more | 12 | 0.08% |
| 3 cycle or more | 8 | 0.3% |
| 4 cycle or more | 6 | 7.6% |
| 5 cycle or more | 4 | 32.2% |

TABLE 2

| Multiple-reflection to be eliminated | Required inclination angle θ | Achievable stray light amount |
| --- | --- | --- |
| 1 cycle or more | 25 | 0.01% |
| 2 cycle or more | 12 | 0.02% |
| 3 cycle or more | 8 | 0.07% |
| 4 cycle or more | 6 | 0.4% |
| 5 cycle or more | 4 | 3.1% |

<Multiple-Reflection Between Filter 3 and Light-Receiving Section 4, Measures Against it and the Given Angle>

Figure 14:
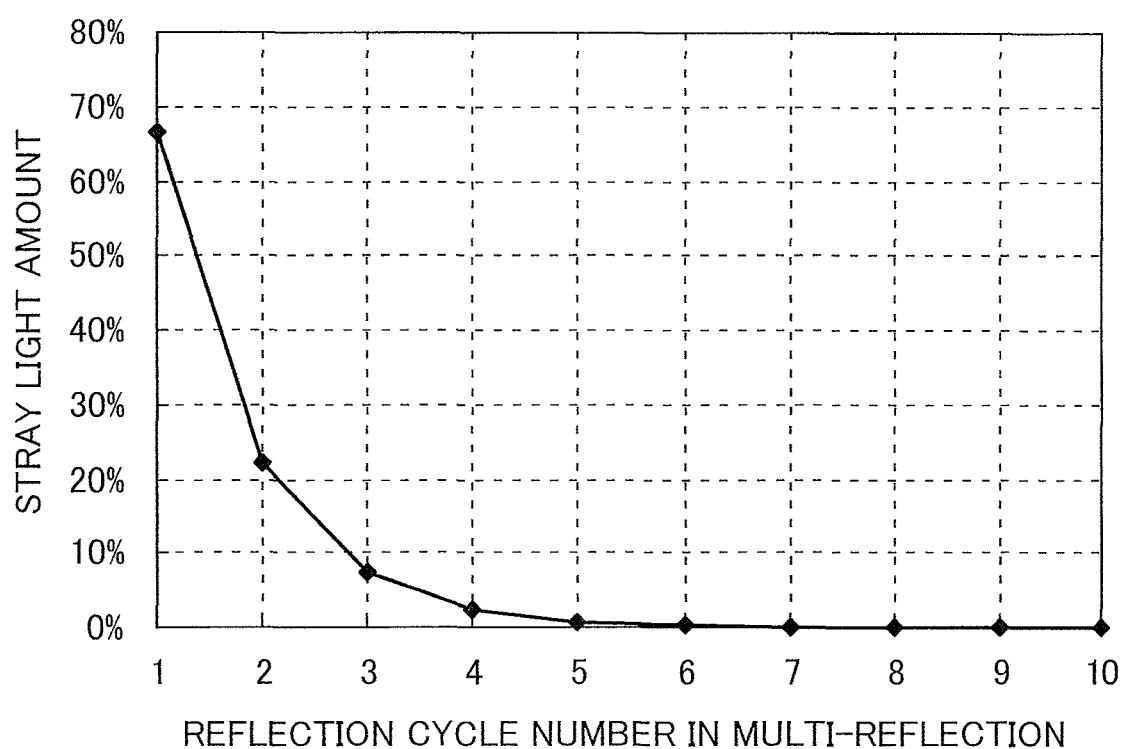
FIG. 14 is a diagram depicting a relationship between the reflection cycle number in multiple-reflection and the stray light amount, in a silicon sensor.

FIG. 14 is a diagram depicting a relationship between the reflection cycle number in multiple-reflection and the stray light amount, in a silicon sensor. In FIG. 14, the horizontal axis represents the reflection cycle number, and the vertical axis represents the stray light amount expressed in units of %.

Differently from the above, a reflectance at the light-receiving surface of the light-receiving section 4 is approximately uniform irrespective of incident position. Thus, an intensity of reflected light is lowered along with an increase in reflection cycle number. As one example, in the case where the light-receiving section 4 is a silicon sensor, the reflectance at a light-receiving surface thereof is about 33%.

Thus, the relationship between the reflection cycle number in multiple-reflection and the stray light amount is a relationship depicted in FIG. 14, i.e., the stray light amount becomes smaller along with an increase in the reflection cycle number in multiple-reflection. Therefore, between the filter 3 and the light-receiving section 4, it is desirable to eliminate a multiple-reflection having one reflection cycle or more. For this purpose, the given angle θ is set to satisfy the aforementioned formula (2). In this case, as to the reflection cycle number in multiple-reflection, when target light entered from the filter 3 is reflected by the light-receiving section 4 and returned to the filter 3 again, the back-and-forth travel is counted as one time (one cycle).

Therefore, as mentioned above, in the spectroscopic unit SU and the spectroscopic device D according to this embodiment, the first optical filter element 31 of the filter 3 is rotated, by the given angle θ, about a rotational axis defined along the third direction or the first direction, and thereby disposed inclinedly with respect to the second optical filter element adjacent thereto. In the embodiment depicted in FIG. 1, the first optical filter element 31 is rotated about a rotational axis defined along the first direction and thereby disposed inclinedly. Thus, target light output from the first optical filter element 31 and reflected before reaching the light-receiving section 4 can be released from a space between the first and second optical filter elements 31, 32, as depicted in FIGS. 2A and 2B, so that it becomes possible to reduce multiple-reflection of the target light between the first and second optical filter elements 31, 32. Therefore, the spectroscopic unit SU and the spectroscopic device D according to this embodiment make it possible to reduce receiving of a light component in a wavelength band other than a specific wavelength band to be essentially received by each light-receiving element. As a result, the spectroscopic unit SU can be improved in spectroscopic accuracy, and the spectroscopic device D can be improved in measurement accuracy.

In the spectroscopic unit SU and the spectroscopic device D according to this embodiment, the first optical filter element 31 is disposed inclinedly with respect to not only the second optical filter element 32 but also the light-receiving surface of the light-receiving section 4. Thus, target light reflected between the filter 3 and the light-receiving section 4 can be released from the filter 3 and the light-receiving section 4, as depicted in FIGS. 2C and 2D, so that it becomes possible to reduce multiple-reflection of the target light not only between the first and second optical filter elements 31, 32 but also between the filter 3 and the light-receiving section 4. Therefore, the spectroscopic unit SU and the spectroscopic device D according to this embodiment make it possible to further reduce the receiving of a light component in a wavelength band other than a specific wavelength band to be essentially received by each light-receiving element. As a result, the spectroscopic unit SU can be further improved in spectroscopic accuracy, and the spectroscopic device D can be further improved in measurement accuracy.

In the spectroscopic unit SU and the spectroscopic device D according to this embodiment, the first optical filter element 31 selected from the plurality of optical filter elements making up the filter 3 and composed of the BPF-LVF element dominantly responsible for multiple-reflection is inclinedly disposed, so that it becomes possible to effectively reduce the multiple-reflection. Thus, the spectroscopic unit SU and the spectroscopic device D according to this embodiment make it possible to reduce the receiving of a light component in a wavelength band other than a specific wavelength band to be essentially received by each light-receiving element.

In the spectroscopic unit SU and the spectroscopic device D according to this embodiment, the first optical filter element 31 can be disposed inclinedly at an angle θ depending on a type of multiple-reflection to be eliminated, based on the aforementioned conditional formulas (1) and (2), so that it becomes possible to reduce the receiving of a light component in a wavelength band other than a specific wavelength band to be essentially received by each light-receiving element, according to design specifications.

Next, respective measurement results of an inventive example and a comparative example will be described.

Inventive Example and Comparative Example

Figure 15:
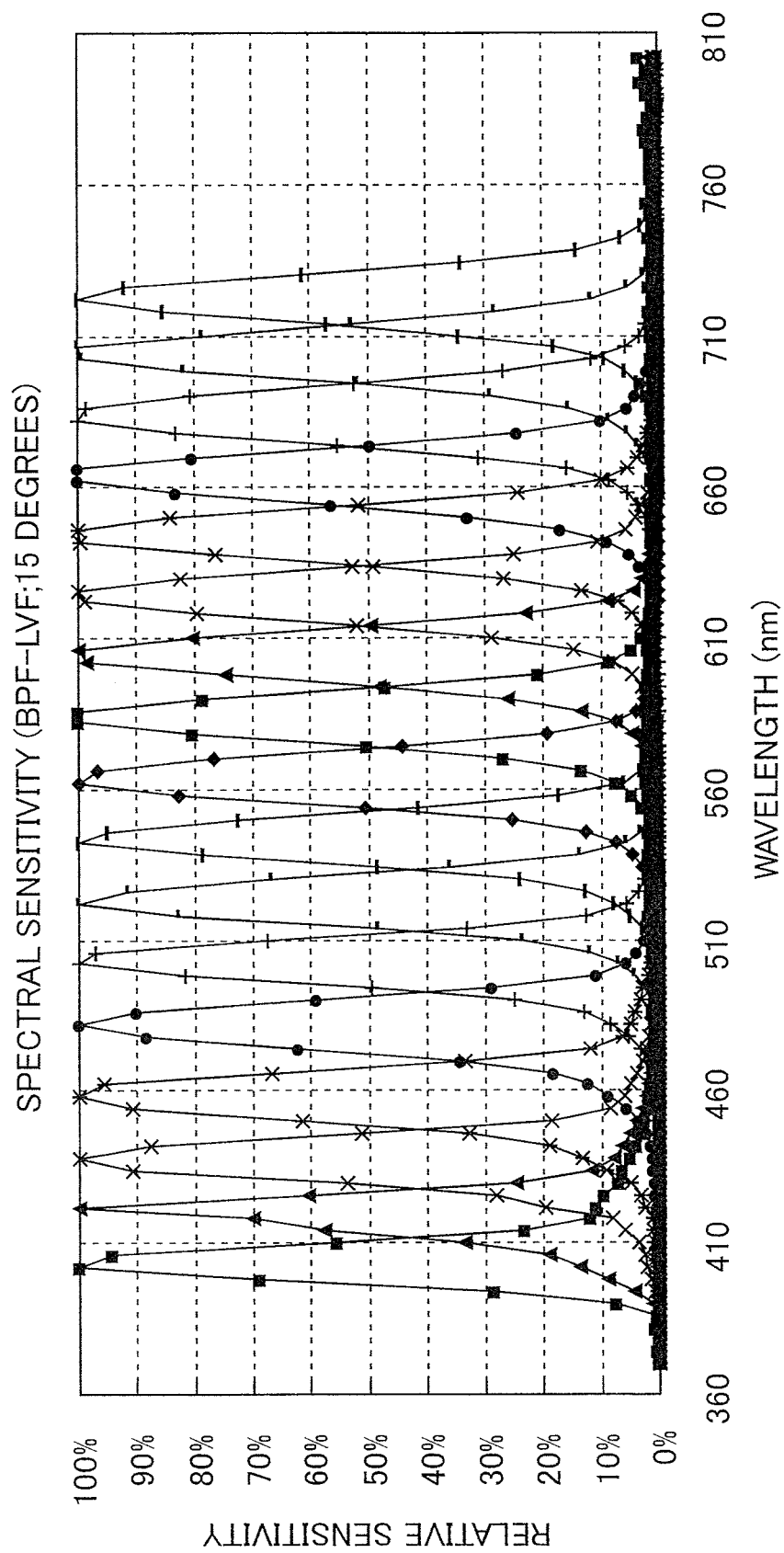
FIG. 15 is a diagram depicting a result of an actual measurement performed using a spectroscopic device in an inventive example.
Figure 16:
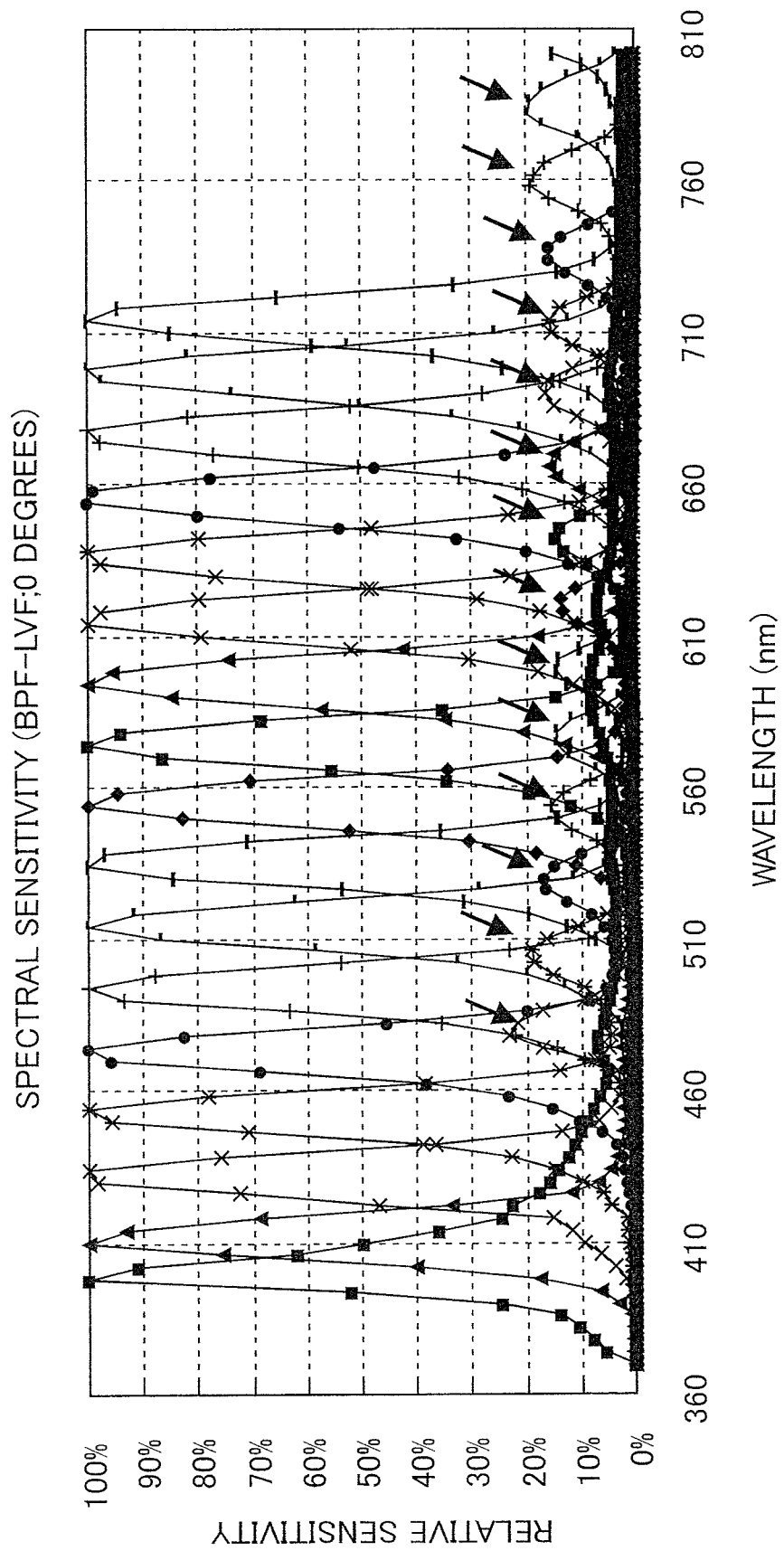
FIG. 16 is a diagram depicting a result of an actual measurement performed using a spectroscopic device in a comparative example.

FIG. 15 is a diagram depicting a result of an actual measurement performed using a spectroscopic device in an inventive example. FIG. 16 is a diagram depicting a result of an actual measurement performed using a spectroscopic device in a comparative example. In FIGS. 15 and 16, the horizontal axis represents a wavelength expressed in units of nm, and the vertical axis represents a relative sensitivity expressed in units of %.

In the spectroscopic devices in the inventive and comparative examples, an LVF having a center wavelength λc linearly varying in the wavelength range of about 400 to 700 nm depending on to an incident position XPc was used as the filter 3, and a 17-ch line sensor was used as the light-receiving section 4. In the spectroscopic device in the comparative example, the given angle was set to 0 degree (θ=0 degree), i.e., the first optical filter element 31 was not disposed inclinedly with respect to the remaining optical filter element(s) and the light-receiving surface of the light-receiving section 4. On the other hand, the spectroscopic device in the inventive example, the given angle was set to 15 degree (θ=15 degree), i.e., the first optical filter element 31 was disposed inclinedly with respect to the remaining optical filter element(s) and the light-receiving surface of the light-receiving section 4.

As is evident from FIG. 16, in the spectroscopic device in the comparative example, a peak of the relative spectral sensitivity appears in a wavelength band shifted from its original wavelength band, as indicated by each of the arrowed lines in the figure. On the other hand, in the spectroscopic device in the inventive example, all of the peaks of the relative spectral sensitivity indicated by the arrowed lines in FIG. 16 disappear. This shows that the spectroscopic device in the inventive example is improved in bandpass filter characteristic, as compared to the spectroscopic device in the comparative example.

Next, another embodiment of the present invention will be described.

Second Embodiment

Figure 17A:
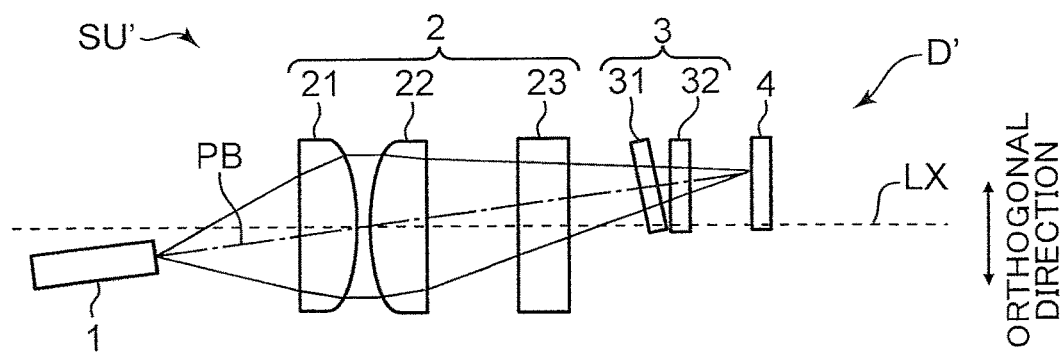
FIG. 17 is a diagram depicting a configuration of a spectroscopic unit in a spectroscopic device according to a second embodiment.
Figure 17B:
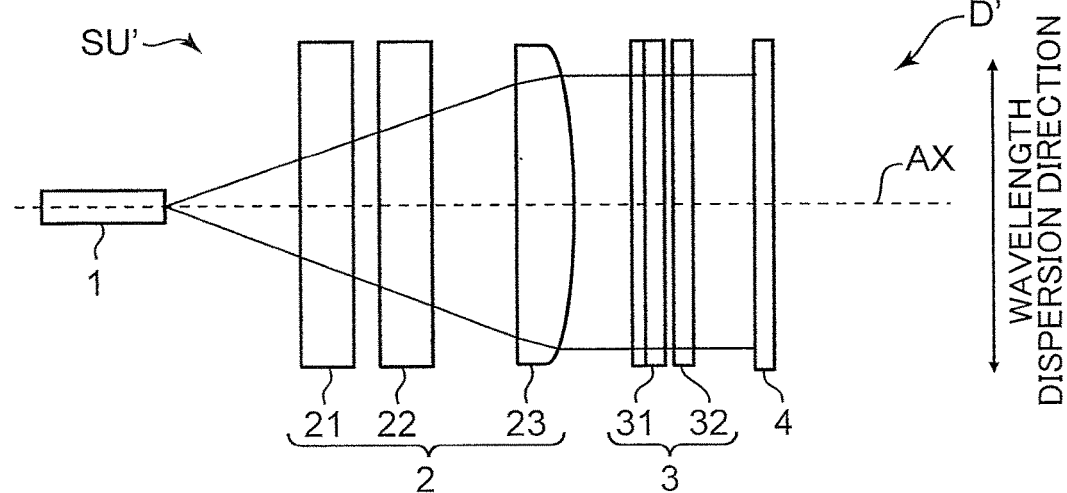

FIG. 17 is a diagram depicting a configuration of a spectroscopic unit in a spectroscopic device according to a second embodiment of the present invention. FIG. 17A is a side view depicting the spectroscopic unit, and FIG. 17B is a top view depicting the spectroscopic unit.

In the spectroscopic unit SU in the spectroscopic device D according to the first embodiment, the opening member 1, the optical system 2, the filter 3 and the light-receiving section 4 are arranged in this order in such a manner that respective optical axes of the opening member 1, the optical system 2, the filter 3 and the light-receiving section 4 are coincident with the optical axis AX of the spectroscopic unit SU. Differently, in the spectroscopic unit SU' in the spectroscopic device D' according to the second embodiment, an opening of an opening member 1, a filter 3 and a light-receiving section 4 are arranged outside an optical axis LX of an optical system 2, in such a manner that a principal ray PB of incident light with respect to the filter 3 enters from a direction normal to the filter 3, as depicted in FIG. 17. That is, as can be understood by comparison between FIGS. 1B and 17B, in top plan view (top view) when viewed in the orthogonal direction, the opening member 1, the optical system 2, the filter 3 and the light-receiving section 4 are arranged in this order in such a manner that respective optical axes of the opening member 1, the optical system 2, the filter 3 and the light-receiving section 4 are coincident with the optical axis AX of the spectroscopic unit SU (SU), in both of the first and second embodiment. Further, as can be understood by comparison between FIGS. 1A and 17A, in side view when viewed in the wavelength dispersion direction, in the first embodiment, the opening member 1, the optical system 2, the filter 3 and the light-receiving section 4 are arranged in this order in such a manner that respective optical axes of the opening member 1, the optical system 2, the filter 3 and the light-receiving section 4 are coincident with the optical axis AX of the spectroscopic unit SU, whereas, in the second embodiment, the opening member 1 is disposed on one side (in FIG. 17A, on a lower side) of the optical axis LX of the optical system 2, and the filter 3 and the light-receiving section 4 are arranged on the other side (in FIG. 17A, on an upper side) of the optical axis LX of the optical system 2, wherein they are arranged in such a manner that a principal ray PB of incident light with respect to the filter 3 is entered from a direction normal to the filter 3. Except that a layout relationship in the second embodiment is different from that in the first embodiment, as mentioned above, the opening member 1, the optical system 2, the filter 3 and the light-receiving section 4 in the spectroscopic unit SU' and the spectroscopic device D' according to the second embodiment are the same as the opening member 1, the optical system 2, the filter 3 and the light-receiving section 4 in the spectroscopic unit SU and the spectroscopic device D according to the first embodiment. Thus, duplicated description thereof will be omitted.

When the first optical filter element 31 is disposed inclinedly at the given angle θ, a filter characteristic indicative of a relationship between the incident position XPc and the transmission wavelength band Bc is slightly shifted toward a shorter wavelength side, and this exerts a slight influence on signals to be output from the light-receiving section 4. In this regard, in the spectroscopic unit SU' and the spectroscopic device D' according to the second embodiment, based on arranging the opening of the opening member 1, the filter 3 and the light-receiving section 4 in the above manner, it becomes possible to reduce the influence on signals to be output from the light-receiving section 4. Thus, the spectroscopic unit SU' in the second embodiment can be further improved in spectroscopic accuracy, and the spectroscopic device D' in the second embodiment can be further improved in measurement accuracy.

Figure 18:
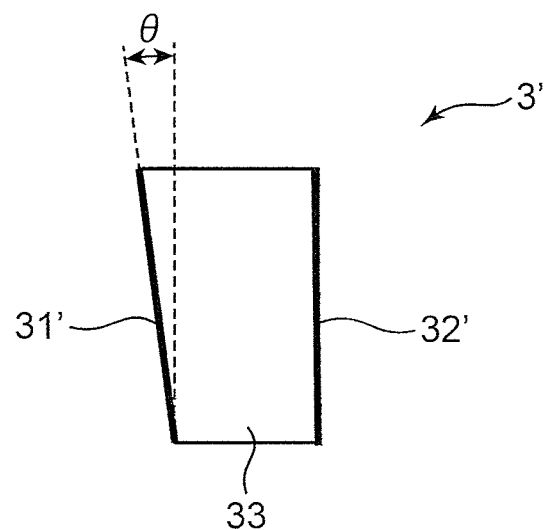
FIG. 18 is a diagram depicting another configuration of the filter in each of the spectroscopic devices according to the embodiments.

FIG. 18 is a diagram depicting another configuration of the filter in each of the spectroscopic devices according to the above embodiments. Each of the spectroscopic units SU, SU' and the spectroscopic devices D, D' according to the first and second embodiments is constructed such that it includes the first and second optical filter elements 31, 32 as separate components. Instead of this filter 3, it is possible to employ a filter 3' including first and second optical filter layers (films) 31', 32' each having the same filter characteristic as that of a respective one of the first and second optical filter elements 31, 32, wherein the first and second optical filter layers 31', 32' are formed, respectively, on a pair of opposite first and second surfaces of a light-transmissive plate-shaped member 33 inclined with respect to each other at the given angle θ, as depicted in FIG. 18. That is, this plate-shaped member 33 is formed such that one of the opposite surfaces formed with the first optical filter layers 31' is inclined at the given angle θ with respect to the other surface formed with the second optical filter layers 32'. For example, each of the first and second optical filter layers (film) 31', 32' is formed through a vapor deposition process. This configuration makes it possible to inclinedly dispose the first optical filter layer 31' more accurately and more easily, as compared to the case where the first and second optical filter elements 31, 32 are formed separately.

As mentioned above, this specification discloses various aspects of techniques. Among them, major techniques will be outlined below.

According to one aspect, there is provided a spectroscopic unit which includes: a filter for spectrally dispersing target light to be measured, on a wavelength-by-wavelength basis, wherein the filter has a transmission wavelength which varies depending on an incident position along a first direction as a given one direction; and a light-receiving section for receiving wavelength-separated light components as light components spectrally dispersed by the filter, and outputting signals corresponding to respective intensities of the received wavelength-separated light components, wherein the filter includes a plurality of optical filter elements sequentially arranged in a direction from an incident side to an output side of the target light, and wherein a first optical filter element as one of the plurality of optical filter elements is rotated, by a given angle, about a rotational axis defined along a third direction orthogonal to each of the first direction and a second direction extending from the incident side toward the output side of the target light, or rotated, by a given angle, about a rotational axis defined along the first direction, and thereby disposed inclinedly with respect to a second optical filter element disposed in adjacent relation to the first optical filter element.

In the spectroscopic unit having the above feature, the first optical filter element is rotated, by the given angle, about a rotational axis defined along the third direction or the first direction, and thereby disposed inclinedly with respect to the second optical filter element disposed in adjacent relation thereto. Thus, the target light reflected between the first and second optical filter members can be released from the filter and the light-receiving section, so that it becomes possible to reduce multiple-reflection of the target light between the first and second optical filter elements 31, 32. Therefore, this spectroscopic unit makes it possible to reduce receiving of a light component in a wavelength band other than a specific wavelength band to be essentially received by each light-receiving element. From a viewpoint of reduction in size, when the first optical filter is inclinedly disposed, it is preferable that the rotational axis is defined along the first axis.

In one specific embodiment, the first optical filter element is rotated, by a given angle, about the rotational axis defined along the third direction, or rotated, by a given angle, about the rotational axis defined along the first direction, and thereby disposed inclinedly with respect to the second optical filter element and a light-receiving surface of the light-receiving section. Preferably, the first optical filter element is rotated, by a given angle, about the rotational axis defined along the third direction or the second direction, and thereby disposed inclinedly with respect to the second optical filter element, so that the first optical filter element is also disposed inclinedly with respect to the light-receiving surface of the light-receiving section.

In the spectroscopic unit having the above feature, the first optical filter element is disposed inclinedly with respect to not only the second optical filter element but also the light-receiving surface of the light-receiving section, so that it becomes possible to reduce not only multiple-reflection between the first and second optical filter elements but also multiple-reflection between the filter and the light-receiving section. Thus, this spectroscopic unit makes it possible to further reduce receiving of a light component in a wavelength band other than a specific wavelength band to be essentially received by each light-receiving element.

In another specific embodiment, the first optical filter element is a bandpass filter-type linear variable filter element.

In the spectroscopic unit having this feature, among the plurality of optical filter element of the filter, the bandpass filter-type linear variable filter element dominantly responsible for multiple-reflection is inclinedly disposed, so that it becomes possible to effectively reduce the multiple-reflection. Thus, this spectroscopic unit makes it possible to reduce receiving of a light component in a wavelength band other than a specific wavelength band to be essentially received by each light-receiving element.

In yet another specific embodiment, the filter includes two optical filter elements consisting of first and second optical filter elements arranged in order from an incident side to an output side of the target light, wherein, in order to eliminate multiple-reflection in which the target light travels back and forth between the first and second optical filter elements N times or more, the given angle is set to satisfy the aforementioned conditional formulas (1) and (2), where: L1 denotes a distance (air conversion length) between the first and second optical filter elements; L2 denotes a distance (air conversion length) between the filter and the light-receiving section; X1 denotes a width of the filter along the third direction; X2 denotes a width of the light-receiving section along the third direction; φ denotes an orthogonal-directional maximum incident angle of the target light entering the second optical filter element; and θ denotes the given angle.

In the spectroscopic unit having this feature, the first optical filter element can be disposed inclinedly at an angle depending on a type of multiple-reflection to be eliminated, so that it becomes possible to reduce the receiving of a light component in a wavelength band other than a specific wavelength band to be essentially received by each light-receiving element, according to design specifications.

In still another specific embodiment, the spectroscopic unit further includes: an opening member having an opening for allowing the target light to be emitted therethrough; and an optical system for guiding the target light emitted through the opening of the opening member to the filter, wherein the opening, the filter and the light-receiving section are arranged outside an optical axis of the optical system, in such a manner that a principal light ray of incident light with respect to the filter enters from a direction approximately normal to the filter.

When the first optical filter element is inclinedly disposed, a filter characteristic indicative of a relationship between an incident position and a transmission wavelength band is slightly shifted toward a shorter wavelength side, and this exerts a slight influence on signals to be output from the light-receiving section. In this regard, in this spectroscopic unit, based on arranging the opening member, the filter and the light-receiving section in the above manner, it becomes possible to reduce the influence on signals to be output from the light-receiving section.

In yet still another specific embodiment, the filter includes two optical filter elements consisting of first and second optical filter elements sequentially arranged in the direction from the incident side to the output side of the target light, wherein the first and second optical filter elements are formed, respectively, on a pair of opposite first and second surfaces of a light-transmissive plate-shaped member inclined with respect to each other at the given angle.

The spectroscopic unit having this feature makes it possible to inclinedly dispose the first optical filter layer more accurately and more easily, as compared to the case where the first and second optical filter elements are formed separately.

According to another aspect, there is provided a spectroscopic device which includes: a spectroscopic unit for spectrally dispersing target light to be measured, on a wavelength-by-wavelength basis, and outputting signals corresponding to respective intensities of received light components having the resulting different wavelengths; and a calculation section for calculating a spectrum of the target light, based on the signals output from the spectroscopic unit, wherein the spectroscopic unit is composed of the aforementioned spectroscopic unit.

The spectroscopic device having this feature makes it possible to reduce the receiving of a light component in a wavelength band other than a specific wavelength band to be essentially received by each light-receiving element. Thus, this spectroscopic device can also be improved in measurement accuracy.

This application is based on Japanese Patent Application Serial No. 2013-257798 filed in Japan Patent Office on Dec. 13, 2013, the contents of which are hereby incorporated by reference.

While the present invention has been described appropriately and fully by way of the embodiments as above with reference to the drawings in order to express the present invention, it should be appreciated that a person skilled in the art can readily change and/or modify the above embodiments. It is therefore understood that any changed or modified embodiment implemented by a person skilled in the art is encompassed within the scope of the appended claims unless the changed or modified embodiment is of a level that deviates from the scope of the appended claims.

INDUSTRIAL APPLICABILITY

The present invention can provide a spectroscopic unit for spectrally dispersing target light on a wavelength-by-wavelength (wavenumber-by-wavenumber) basis and outputting signals corresponding to respective intensities of received wavelength-separated light components, and provide a spectroscopic device using the spectroscopic unit.

The invention claimed is:

1. A spectroscopic unit comprising:
a filter for spectrally dispersing target light to be measured, on a wavelength-by-wavelength basis, the filter having a transmission wavelength which varies depending on an incident position along a first direction; and
a light-receiving section for receiving wavelength-separated light components spectrally dispersed by the filter, and outputting signals corresponding to respective intensities of the received wavelength-separated light components,
wherein the filter comprises a plurality of optical filter elements sequentially arranged in a direction from an incident side to an output side of the target light,
wherein the plurality of optical filter elements comprises a first optical filter element and a second optical filter element disposed adjacent to the first optical filter element,
and wherein the first optical filter is rotated, by a given angle, about a rotational axis defined along a third direction orthogonal to each of the first direction and a second direction extending from the incident side toward the output side of the target light, or rotated, by a given angle, about a rotational axis defined along the first direction, and thereby disposed inclinedly with respect to the second optical filter element.

2. The spectroscopic unit as recited in claim 1, wherein the first optical filter element is disposed inclinedly with respect to the second optical filter element and a light-receiving surface of the light-receiving section.

3. The spectroscopic unit as recited in claim 1, wherein the first optical filter element is a bandpass filter-type linear variable filter element.

4. The spectroscopic unit as recited in claim 1, wherein the filter comprises two optical filter elements consisting of first and second optical filter elements sequentially arranged in the direction from the incident side to the output side of the target light, and wherein, in order to eliminate multiple-reflection in which the target light travels back and forth between the first and second optical filter elements N times or more, the given angle is set to satisfy the following conditional formulas (1) and (2):

$$L_1 \tan\phi + 2L_1 \sum_{n=1}^{N-1} \tan(2n\theta + \phi) + L_2\tan(2N\theta + \phi) > \frac{x_1}{2} + \frac{x_2}{2} \quad (1)$$

$$L_2(\tan\phi + \tan(2\theta + \phi)) > x_2 \quad (2)$$

where:
L1 denotes a distance (air conversion length) between the first and second optical filter elements;
L2 denotes a distance (air conversion length) between the filter and the light-receiving section;
X1 denotes a width of the filter along the third direction;
X2 denotes a width of the light-receiving section along the third direction;
φ denotes an orthogonal-directional maximum incident angle of the target light entering the second optical filter element; and
θ denotes the given angle.

5. The spectroscopic unit as recited in claim 1, which further comprises:
an opening member having an opening for allowing the target light to be emitted therethrough; and
an optical system for guiding the target light emitted through the opening of the opening member to the filter, wherein the opening, the filter and the light-receiving section are arranged outside an optical axis of the optical system, in such a manner that a principal light ray of incident light with respect to the filter enters from a direction approximately normal to the filter.

6. The spectroscopic unit as recited in claim 1, wherein the filter comprises two optical filter elements consisting of first and second optical filter elements sequentially arranged in the direction from the incident side to the output side of the target light, the first and second optical filter elements being formed, respectively, on a pair of opposite first and second surfaces of a light-transmissive plate-shaped member inclined with respect to each other at the given angle.

7. A spectroscopic device comprising:
- a spectroscopic unit for spectrally dispersing target light to be measured, on a wavelength-by-wavelength basis, and outputting signals corresponding to respective intensities of received wavelength-separated light components; and
- a calculation section for calculating a spectrum of the target light, based on the signals output from the spectroscopic unit, wherein the spectroscopic unit is composed of the spectroscopic unit as recited in claim 1.

* * * * *